US006880846B2

(12) United States Patent
Schonfeld

(10) Patent No.: US 6,880,846 B2
(45) Date of Patent: *Apr. 19, 2005

(54) BICYCLE WITH SHOCK ABSORBER

(76) Inventor: Carl W. Schonfeld, 2920 Luciernaga St. #101, Carlsbad, CA (US) 92009

( * ) Notice: Subject to any disclaimer, the term of this patent is extended or adjusted under 35 U.S.C. 154(b) by 0 days.

This patent is subject to a terminal disclaimer.

(21) Appl. No.: 10/146,636

(22) Filed: May 14, 2002

(65) Prior Publication Data

US 2002/0130485 A1 Sep. 19, 2002

Related U.S. Application Data

(63) Continuation-in-part of application No. 09/431,878, filed on Nov. 2, 1999, now Pat. No. 6,386,567, which is a continuation-in-part of application No. 09/049,266, filed on Mar. 27, 1998, now Pat. No. 5,975,550.

(51) Int. Cl.[7] .................................................. B62K 1/00
(52) U.S. Cl. ...................................... 280/283; 280/277
(58) Field of Search ............................... 280/283, 284, 280/285, 286, 275, 277, 124.169; 180/227; 267/279, 281

(56) References Cited

U.S. PATENT DOCUMENTS

| 4,083,265 A | * | 4/1978 | Bremer, Jr. ................... 74/574 |
| 5,975,550 A | * | 11/1999 | Schonfeld .................... 280/284 |
| 6,341,768 B1 | * | 1/2002 | Kao et al. .................... 267/273 |
| 6,386,567 B1 | * | 5/2002 | Schonfeld .................... 280/283 |
| 6,439,593 B1 | * | 8/2002 | Tseng ......................... 280/284 |
| 6,481,700 B1 | * | 11/2002 | Fujii ...................... 267/140.11 |
| 6,575,441 B1 | * | 6/2003 | Lefebvre ..................... 267/281 |
| 6,648,356 B1 | * | 11/2003 | Osmecki ..................... 280/284 |
| 6,662,683 B1 | * | 12/2003 | Takahashi et al. ........ 74/573 F |
| 2003/0193163 A1 | * | 10/2003 | Chamberlain et al. ...... 280/284 |

FOREIGN PATENT DOCUMENTS

| JP | 8175455 | * | 7/1996 |
| JP | 9118285 | * | 5/1997 |

* cited by examiner

Primary Examiner—Bryan Fischmann
(74) Attorney, Agent, or Firm—John R. Ross; John R. Ross, III

(57) ABSTRACT

A bicycle with a torsional shock absorber comprised of a torsion spring assembly. The elements of the torsion spring assembly include: housing, a shaft positioned within the housing, a rubbery substance positioned between the interior surface of the housing and the outer surface of the shaft, and a damper. The torsional shock absorber is mounted on the bicycle such that shock forces are converted into rotational forces tending to rotate the shaft within the housing. These rotational forces are resisted by the spring force created by the rubbery substance within the torsion spring assembly; thereby absorbing the shock forces. In a preferred embodiment, the rubbery substance is bonded to the interior surface of the housing and the outer surface of the shaft. In a preferred embodiment, the front and rear portions of the bicycle frame pivot about the pedal spindle axis. Also, in a preferred embodiment, the housing of the torsion spring assembly is rigidly connected to the front portion of the bicycle frame in-between the top tube and middle brace and just in front of the seat tube. The rear portion of the bicycle frame is pivotally connected to two torsion arms rigidly connected to the shaft.

21 Claims, 22 Drawing Sheets

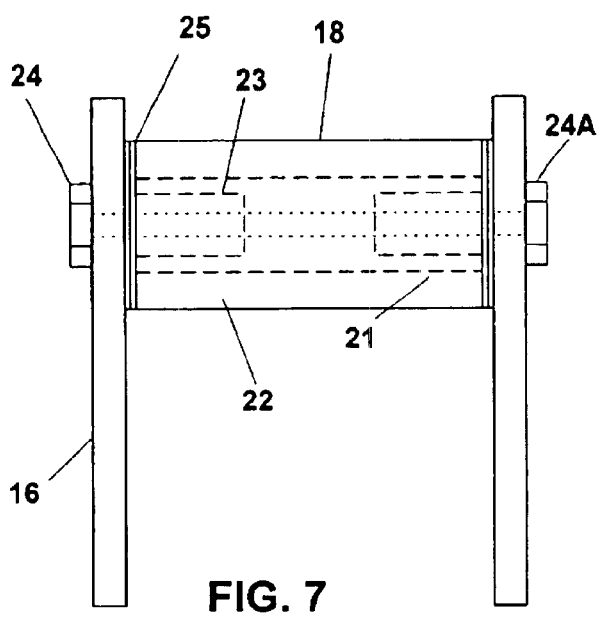
FIG. 7
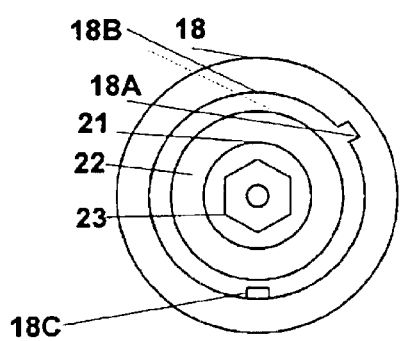
FIG. 8B
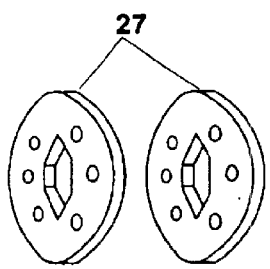
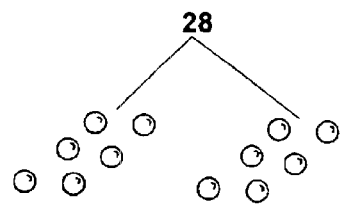
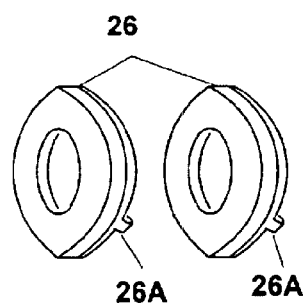
FIG. 8A

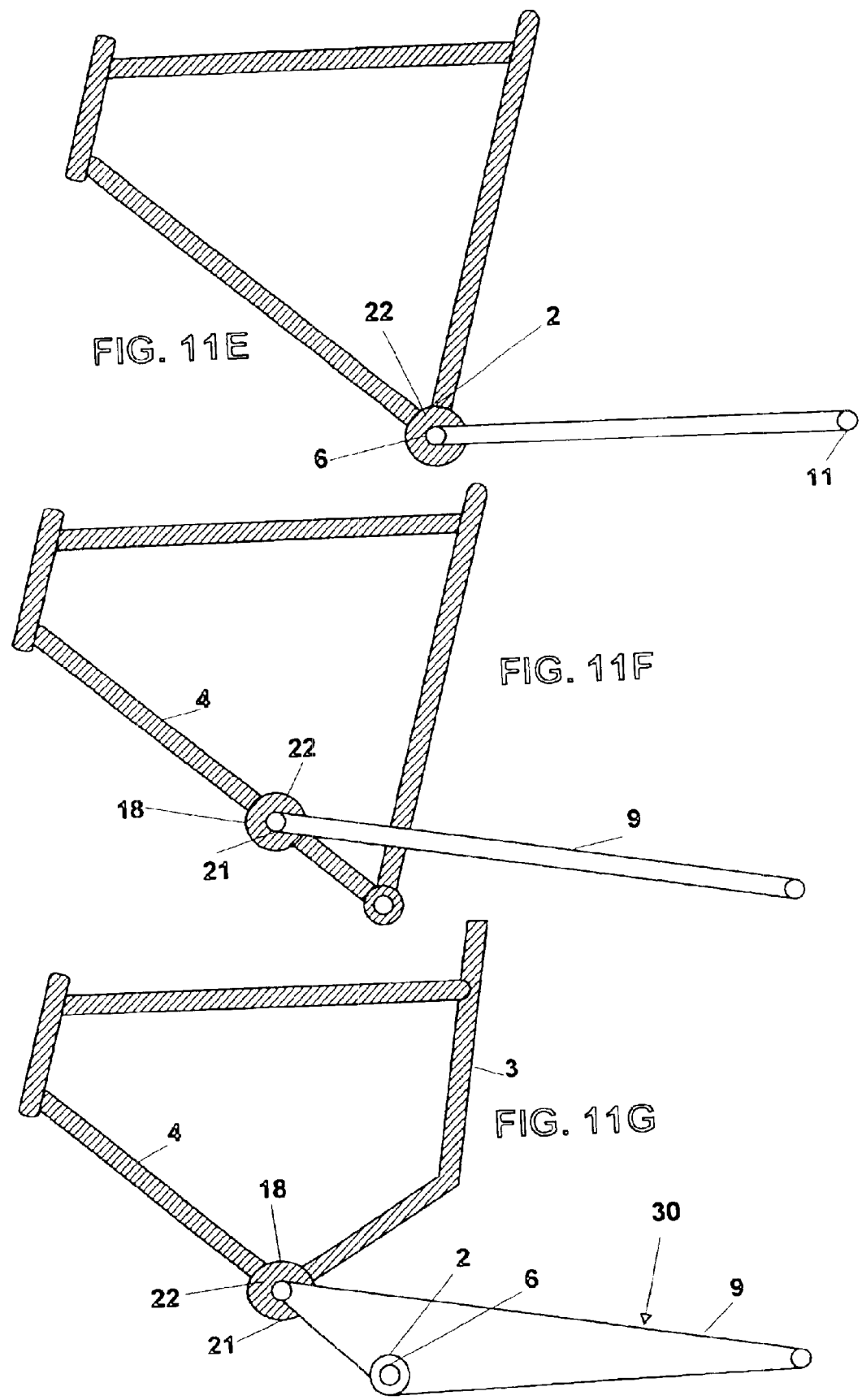

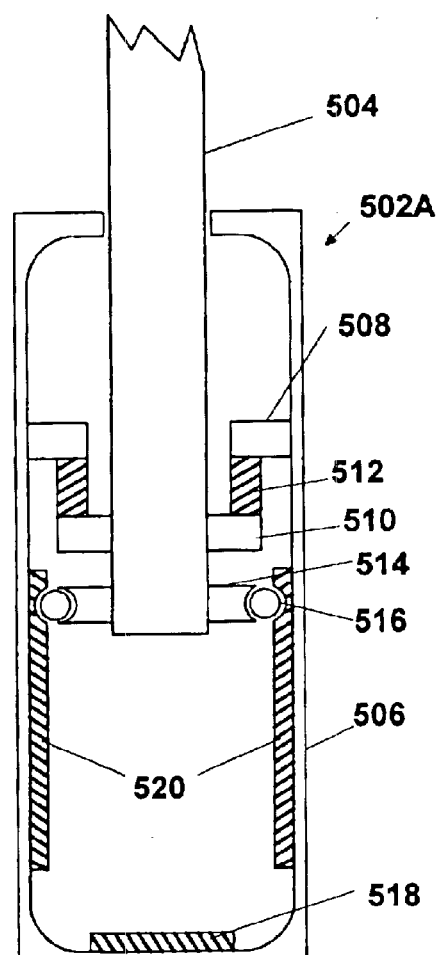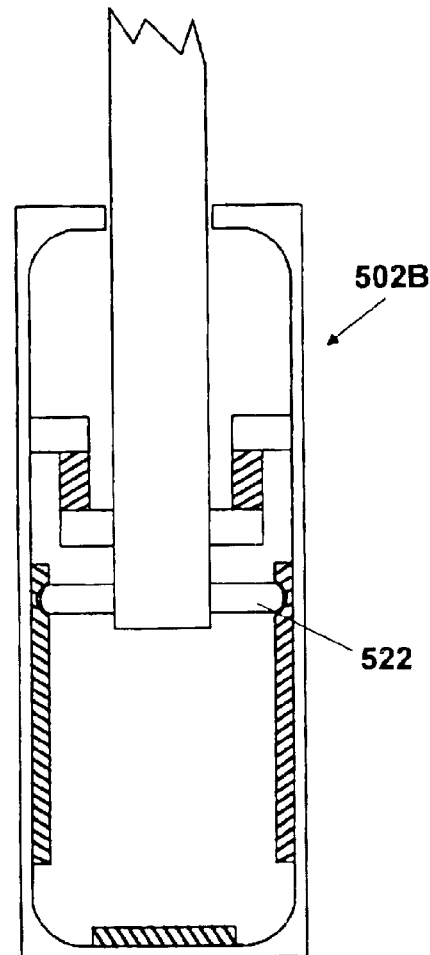
FIG. 16
FIG. 17

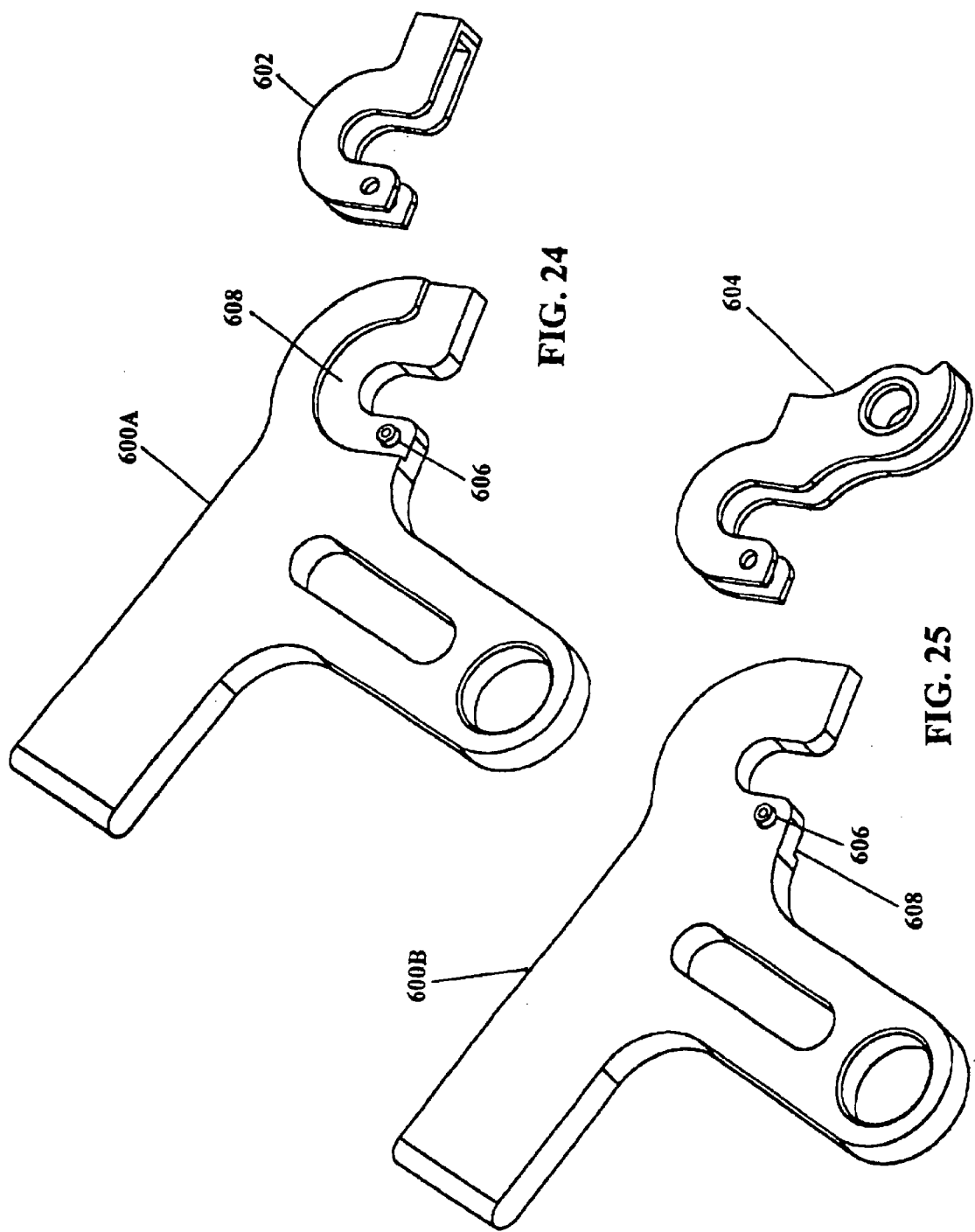

BICYCLE WITH SHOCK ABSORBER

This invention relates to bicycles, and more specifically to bicycles with shock absorbers. This application is a continuation-in-part of Ser. No. 09/431,878 filed Nov. 2, 1999 (which issued as U.S. Pat. No. 6,386.567 on May. 14, 2002), which is a continuation-in-pan of Ser. No. 09/049,266 filed Mar. 27, 1998 (which issued as U.S. Pat. No. 5,975,550 on Nov. 2, 1999).

BACKGROUND OF THE INVENTION

Bicycles have been used as a means of recreation and transportation for many years. With the advent of the fuel crisis in the 1970's and the rise in overall health consciousness in society, bicycling recently gained even greater popularity. Finally, just recently, mountain biking has become the most popular form of bicycling with sales of mountain bikes surpassing those of ordinary road bikes.

With the increase in the popularity of mountain biking, bicycle developers have been faced with issues that were of little or no concern when most bicycle riders road on the street. Foremost of these issues is the issue of shock absorption devices for a bicycle. Mountain bikers quickly learned that a rough trail could equate to a sore body without proper suspension for the bicycle.

Hence, there have been many recent developments of shock absorbers for bicycles. These developments have tended to consist of a variety of linear shock absorbers placed at various locations on a bicycle frame to provide for front and rear shock absorption. While satisfactory results have been obtained, unfortunately there have been problems associated with traditional shock absorbers for bicycles. Specifically, linear shock absorbers tend to be expensive, high maintenance devices that tend to wear out long before most of the other bicycle parts. Owners have been forced to either buy a new bicycle or replace the shock absorbers, both of which are very costly.

Torsion springs are also well known devices. Torsion springs are very low maintenance, inexpensive, and tend to have a long life that often equals or surpasses that of the equipment on which they are being used. Torsion spring prior use has included many applications, such as: exercise equipment, military equipment, automobiles and trucks.

Dip Brazing

Dip brazing is a method of joining together metals by dipping the work into a hot, molten salt bath and using a filler metal with a melting point above 800 deg. F. but lower than that of the metals to be joined. Dip brazing is well known in the prior art. Currently, hollow tubular bicycle frames are made by extruding individual frame sections. These frame sections can then be bent to a desired shape, coped and individually welded together. Some of the major disadvantages to making bicycle frames in this manner are: 1) the manufacturer is limited by the amount and type of bending and coping that he is able to do to the extruded frame sections, and 2) the extra time it takes to align and weld each frame member and frame.

Prior Art Drop Protectors/Derailleur Hangers

The bicycle rear drop is that portion of the bicycle frame to which the rear wheel attaches. It is usually fused to the rear portion of the bicycle frame. Typically, the derailleur hanger is rigidly attached to the bicycle drop. The bicycle drop is subject to tremendous amounts of stresses and forces. Because the drop is fused to the rear portion of the bicycle, the entire rear portion of the frame would need to be replaced if the drop is damaged.

In the prior art, drop protectors and replaceable hangers are currently available. However, current drop protectors and hangers only protect the outside of the bicycle drop. Moreover, current drop protectors are screwed into the side of the drop, requiring significant time, effort and tools to replace. In addition, current drop protectors do not create a clamping action on the drop when the rear wheel axle is tightened to the rear drop.

What is needed is a shock absorption device for a bicycle that is low maintenance, inexpensive and has a long life.

SUMMARY OF THE INVENTION

The present invention provides a bicycle with a torsional shock absorber comprised of a torsion spring assembly. The elements of the torsion spring assembly include: housing, a shaft positioned within the housing, a rubbery substance positioned between the interior surface of the housing and the outer surface of the shaft, and a damper. The torsional shock absorber is mounted on the bicycle such that shock forces are converted into rotational forces tending to rotate the shaft within the housing. These rotational forces are resisted by the spring force created by the rubbery substance within the torsion spring assembly; thereby absorbing the shock forces. In a preferred embodiment, the rubbery substance is bonded to the interior surface of the housing and the outer surface of the shaft. In a preferred embodiment, the front and rear portions of the bicycle frame pivot about the pedal spindle axis. Also, in a preferred embodiment, the housing of the torsion spring assembly is rigidly connected to the front portion of the bicycle frame in-between the top tube and middle brace and just in front of the seat tube. The rear portion of the bicycle frame is pivotally connected to two torsion arms rigidly connected to the shaft.

BRIEF DESCRIPTION OF THE DRAWINGS

FIG. 7 shows a top view of the torsional shock absorber assembly.

FIGS. 8A–8B show elements for damping the torsional shock absorber assembly.

FIGS. 11A–11G show some possible bicycle frames that could use the torsional rear suspension assembly.

FIGS. 16 and 17 show preferred embodiments of linear shock absorbers with a hysteresis damper.

FIG. 24 shows an exploded view of a drop protector and bicycle drop.

FIG. 25 shows an exploded view of a drop protector/derailleur hanger and bicycle drop.

DETAILED DESCRIPTION OF THE PREFERRED EMBODIMENT

Preferred embodiments of the present invention are described below by reference to FIGS. 1–25.

Shock Forces Converted Into Rotational Forces

Figure 9:
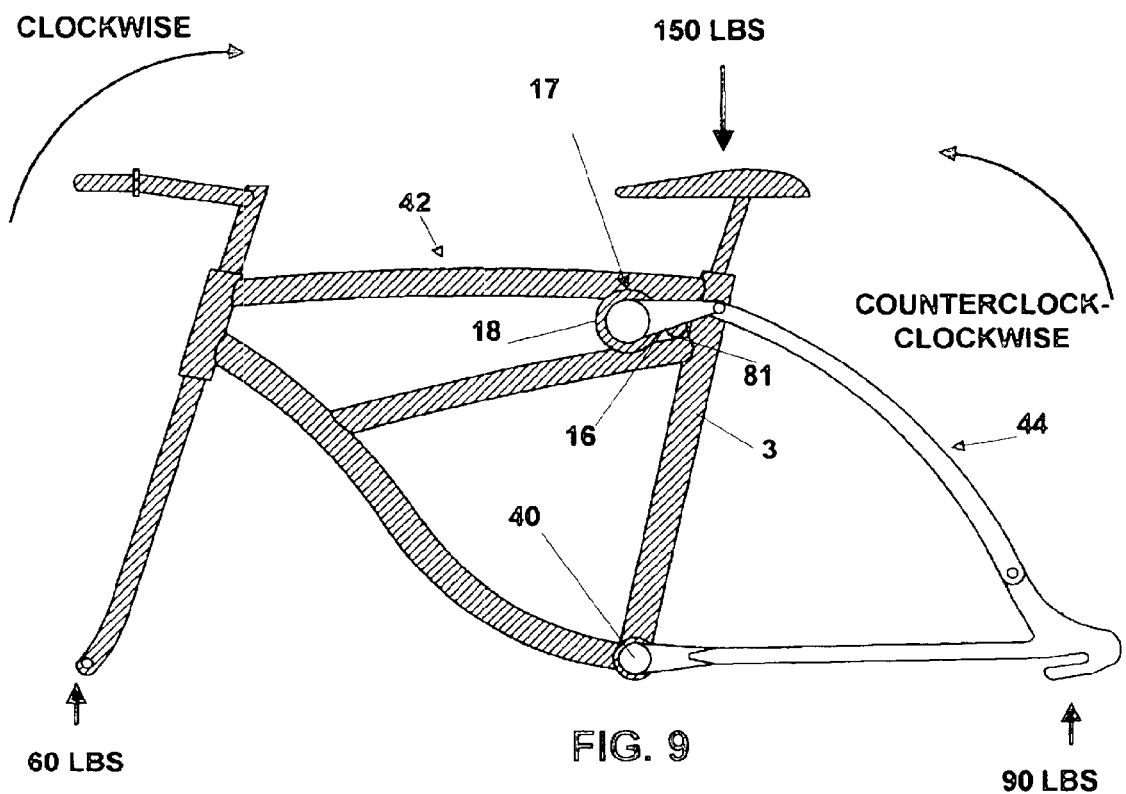
FIG. 9 shows the operation of the torsional rear suspension assembly.

FIG. 9 shows the basic principles of the present invention. The frame of a bicycle shown in FIG. 9 is divided into two parts, a front portion 42 (shown shaded) and a rear portion 44 (unshaded). Both sections are pivotally connected to each other at pedal axis 40 and they pivot about pedal axis 40. A torsion spring assembly is shown at 17. Torsion spring housing 18 is welded to the front portion of the frame and the shaft of the torsion spring assembly 17 is attached to torsion arm 16 which is in turn pivotally connected to rear portion 44. The torsion spring used in this embodiment is rated at about 13 inch-pounds per degree and is pre-loaded to about 20 degrees or about 260 inch-pounds by pivoting torsion arm 16 counter-clockwise from its relaxed horizontal position. Tube 81 is welded to seat tube 3 and prevents torsion arm 16 from returning to its relaxed position. A 150 pound rider will produce a steady torque of about 300 inch-pounds on torsion spring assembly 17, which will rotate the shaft of assembly 17 about 23 degrees (i.e., 3 degrees beyond the pre-loaded position). Shock forces applied to either front or rear axis by bumps are absorbed by torsion spring assembly 17.

FIRST PREFERRED EMBODIMENT

The present invention may be utilized with most pre-existing bicycle frames. However, for the preferred embodiment, a cruiser type frame was modified. The frame of the cruiser bicycle is shown as bicycle frame 1 in FIG. 1. The procedures for modifying a bicycle to accept the present invention and the use of the present invention are listed below.

Concentric Relative Rotation Bottom Bracket Pivot

Figure 1:
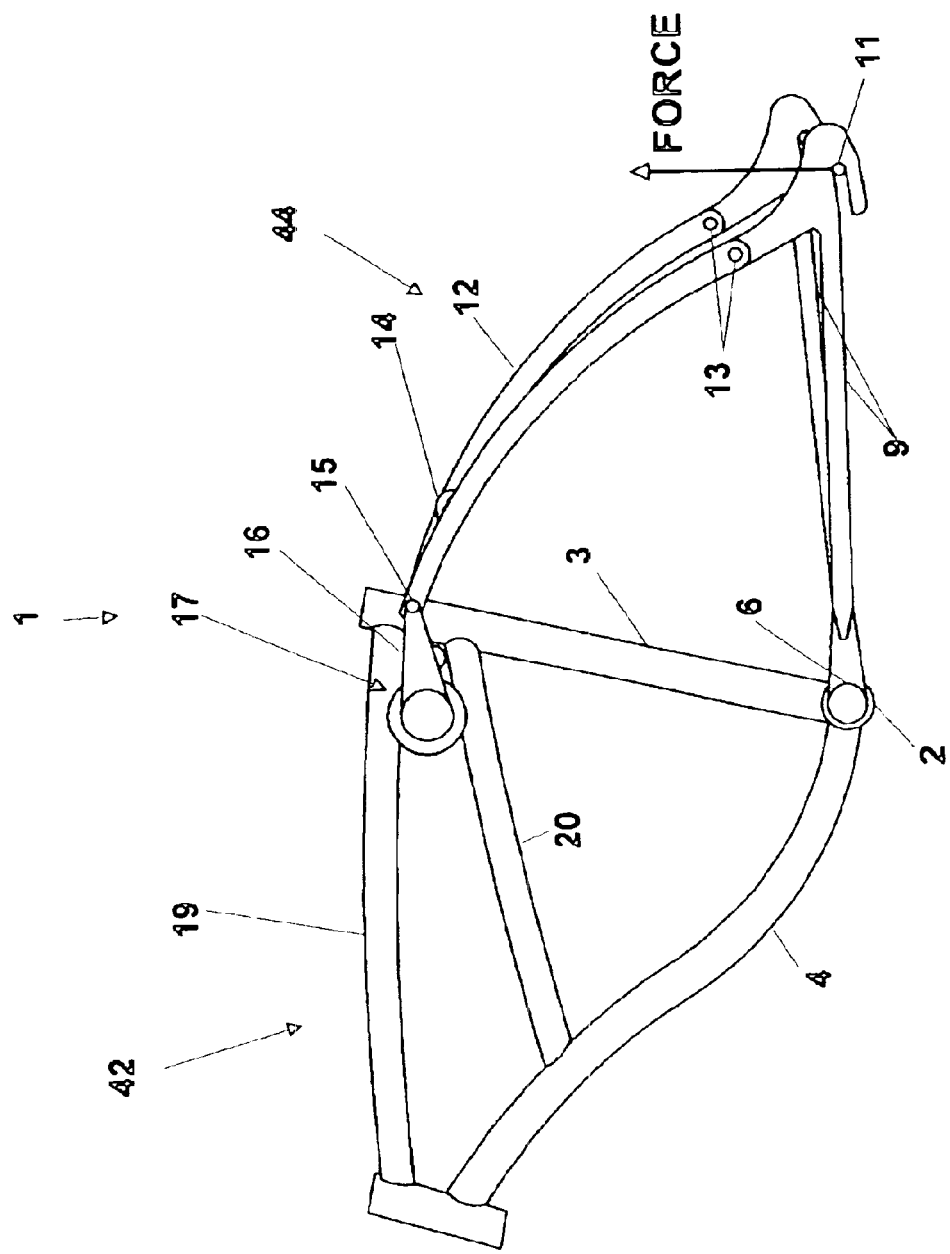
FIG. 1 shows the torsional rear suspension assembly attached to a bicycle frame.
Figure 2:
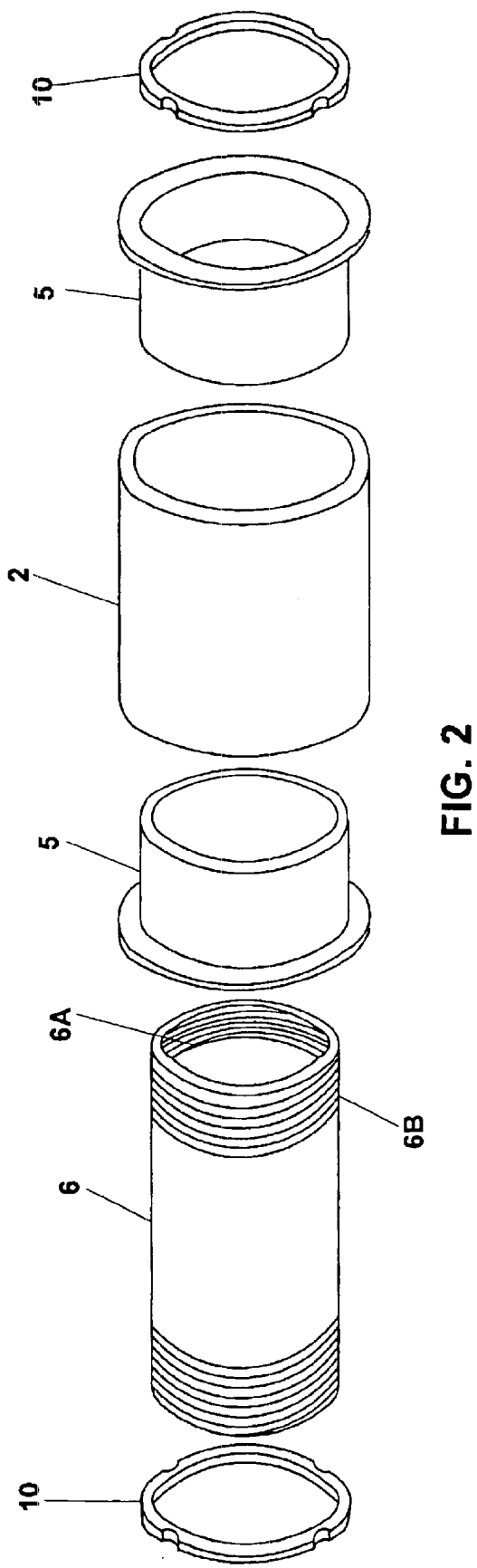
FIG. 2 shows the elements of the bottom bracket pivot assembly.
Figure 3:
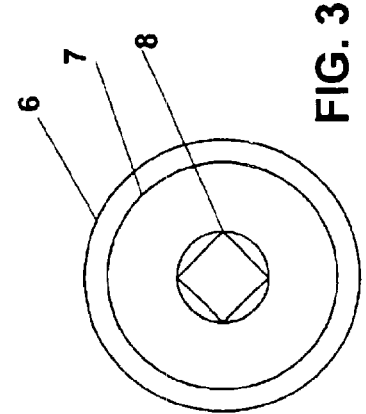
FIG. 3 shows a side view of the bottom bracket pivot assembly.
Figure 4:
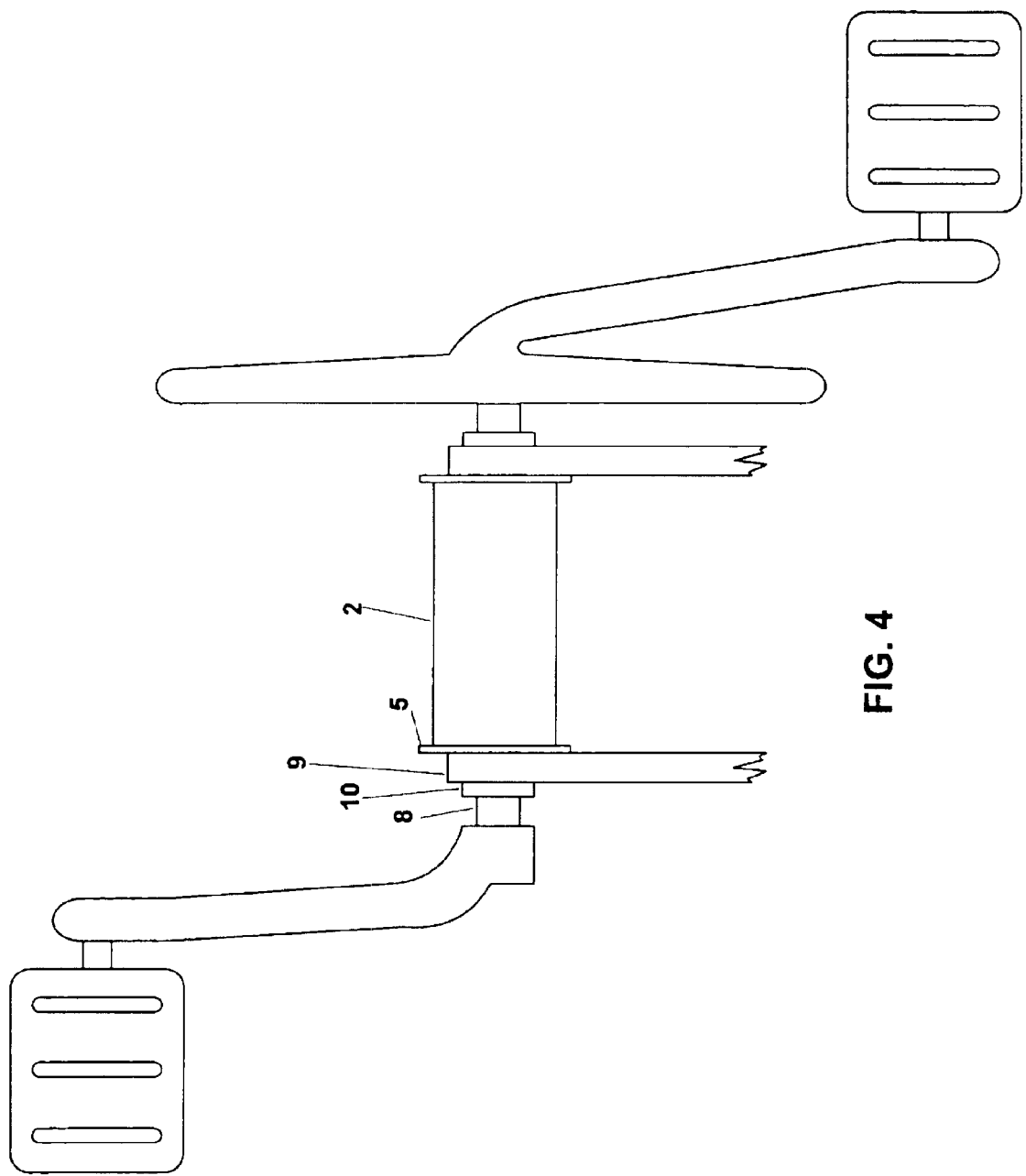
FIG. 4 shows a top view of the bottom bracket pivot assembly.

Aluminum bottom bracket housing 2 is welded to bicycle frame 1 at the intersection of seat support tube 3 and down tube 4, as shown in FIG. 1. The elements that comprise the bottom bracket pivot assembly are illustrated in FIG. 2. Sleeve bearing 5 is a dry, self-lubricating plastic bearing. Sleeve bearing 5 press fits into aluminum bottom bracket housing 2. Aluminum bottom bracket shell 6 slips freely inside both sleeve bearings 5 so as to rotate on sleeve bearings 5. Bottom bracket shell 6 has internal threads 6A so that bearing casings 7 can be threaded onto both sides of bottom bracket shell 6, as shown in FIG. 3. Bottom bracket spindle 8 rotates freely while supported by bearing casings 7. As shown in FIG. 4, swingarms 9 fit over bottom bracket shell 6 and are tightened against sleeve bearings 5 by tightly threading aluminum lock ring 10 on external threads 6B of bottom bracket shell 6.

The operation of the bottom bracket pivot assembly can best be determined by reference to FIGS. 1 and 4. As the bicycle is ridden, vertical forces are applied at the rear wheel and transferred to rear portion 44 of the frame at 11, as shown in FIG. 1. Force causes swingarms 9 to pivot around bottom bracket shell 6. Referring to FIG. 4, because swingarms 9 are held tightly against sleeve bearings 5 by lock rings 10, the following bottom bracket pivot assembly elements rotate relative to bottom bracket pivot housing 2 along with swingarms 9: lock rings 10, sleeve bearings 5, and bottom bracket shell 6 (FIG. 2). Bottom bracket housing 2 is welded to the bicycle frame and obviously stays stationary relative to front portion 42 (FIG. 1) of the frame. The bicycle pedals are attached to bottom bracket spindle 8 which is supported by bearing casings 7 (FIG. 3) and rotates within housing 2 as the pedals are rotated as shown in FIG. 4.

An important advantage of the above design is that swingarms 9 pivot with respect to spindle 8, avoiding any change in chain length (i.e., the distance between the axis of the pedal gear and the axis of the rear wheel gears). With no change in chain length, this suspension can be used with all single-gear bicycle drivetrain designs, such as BMX, cruiser, city bikes, and any bicycle that uses internally geared hubs, without the need for chain tensioning devices.

Figure 5:
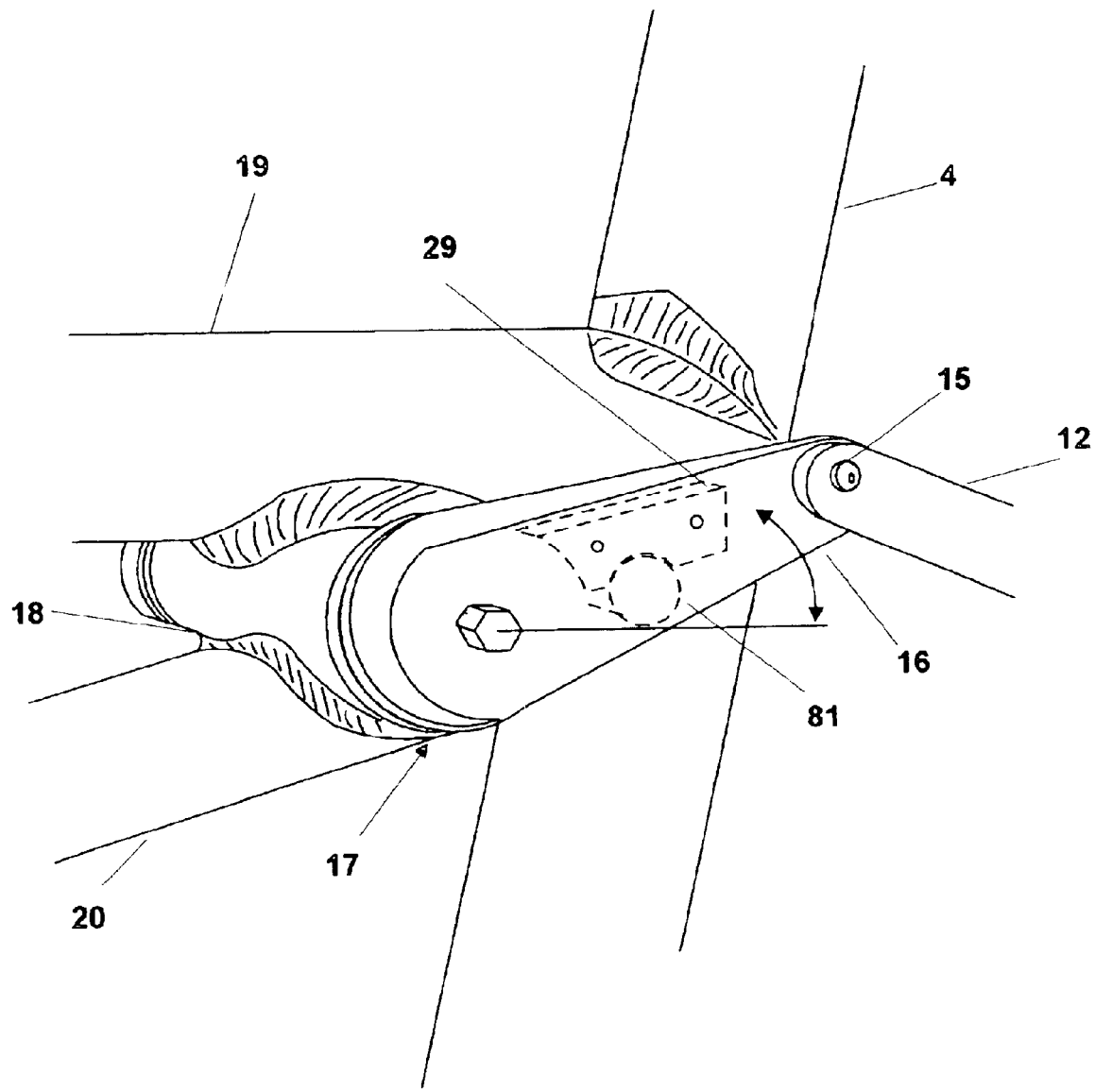
FIG. 5 shows the torsional shock absorber assembly.

As shown in FIG. 1, swingarms 9 are pivotally attached to rear arms 12 at pivot axis 13. Rear arms 12 are welded together at bar 14 for support and are pivotally attached to torsion arms 16 at pivot axis 15 as shown in FIGS. 1 and 5. Torsion arms 16 are rigidly attached to the shaft of torsion spring assembly 17.

Rubber Torsion Shock Absorber

Aluminum rubber torsion spring housing 18 is welded to the bicycle frame in between top tube 19 and middle brace 20, as shown in FIGS. 1 and 5. Tube 81 is also welded to the bicycle frame rearward of torsion spring housing 18 and between top tube 19, seat support tube 3 and middle brace 20.

Figure 6A:
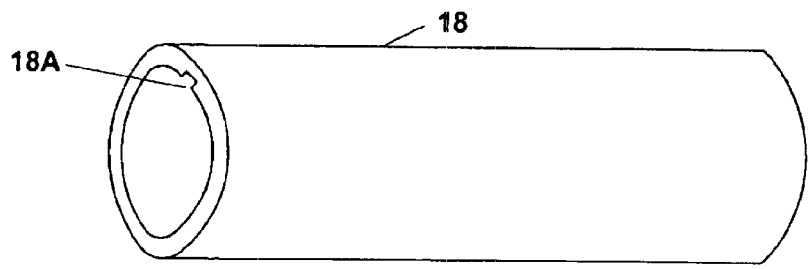
FIGS. 6A–6H show the elements of the torsional shock absorber assembly.
Figures 6B, 6G:
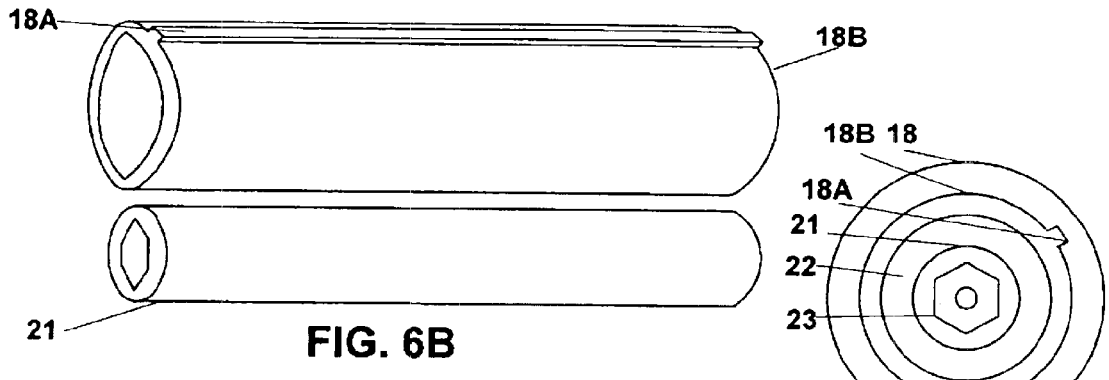

The internal elements of a preferred torsion spring assembly 17 are shown in FIGS. 6A–6G and 7. An end view of torsion spring 50 as shown in FIG. 6H. Aluminum shaft housing 21 is inserted inside outer housing 18B. Rubbery substance 22 is bonded to the internal smooth surface of outer housing 18B and the external smooth surface of shaft housing 21. Key 18A functions to prevent slipping between outer housing 18B and torsion spring housing 18, as shown in FIG. 6G.

Preferred torsion springs, each one consisting of outer housing 18B, rubbery substance 22 and shaft housing 21 is available from B.F. Goodrich Company, at 6061 B.F. Goodrich Boulevard, Blount Island, Jacksonville, Fla. 32226.

Figures 6C, 6D:
Figures 6E, 6H:
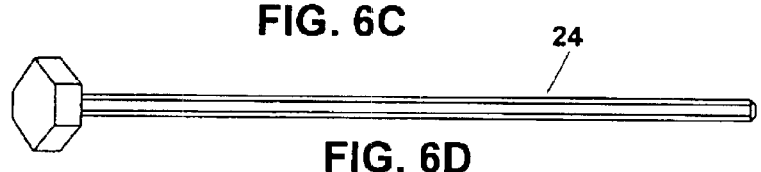
Figure 6F:
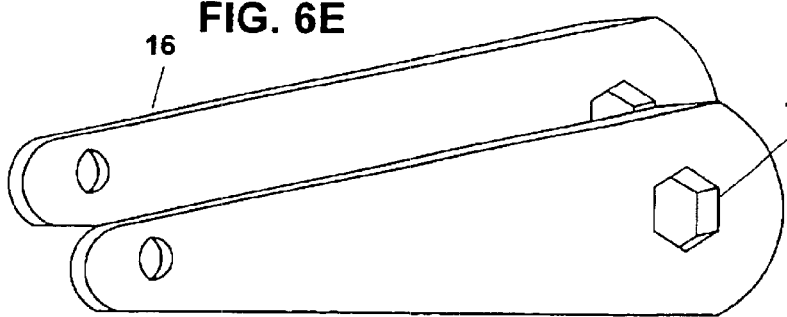

Shaft housing 21 has a hexagonal internal shape that corresponds to hexagonal actuation shafts 23, as shown in FIGS. 6G and 6C. Actuation shafts 23 are inserted in both ends of shaft housing 21 so that each shaft 23 extends from each end of shaft housing 21 approximately ½ inch. Plastic friction washers 25, as shown in FIG. 6E and FIG. 7, are slid over the exposed ends of shaft 23. Torsion arms 16 with hexagonal cutout 16A are then slid over shafts 23. Bolt 24 is threaded through either one of actuation shafts 23 and then out through the other actuation shaft 23. Nut 24A is threaded over the exposed end of bolt 24 until the head of bolt 24 and nut 24A presses tightly against torsion arms 16, as shown in FIG. 7.

The operation of torsion spring assembly 17 can be understood by reference to FIG. 1 and FIG. 7. As the bicycle is ridden, vertical force components are imparted to rear wheel axis 11, which will produce on swingarms 9 counter-clockwise torque around bottom bracket housing 2. As swingarms 9 tend to rotate counter-clockwise, this motion will be transferred to rear arms 12, which are connected to torsion arms 16 at upper pivot axis' 15. Hence, vertical forces on rear wheel axis 11 produces a rotational force component on torsion arms 16. The rotational force component tends to force torsion arms 16 to rotate counter-clockwise. However, torsion arms 16 are connected to actuation shafts 23, which are rigidly connected to shaft housing 21. As shaft housing 21 tends to rotate, its motion is resisted through rubbery substance 22 and the shock of the force originally transferred through rear wheel axis 11 is absorbed.

Pre-loading the Rubber Torsion Spring

Preferably, torsion spring assembly 17 is pre-loaded. In other words, better shock absorbing effects are achieved if torsion spring 50 is already is a state of torque prior to use of the bicycle. If there were no pre-loading, the rear suspension of the bicycle would not be able to accommodate different rider weights and riding conditions.

Pre-loading of torsion spring assembly 17 is best understood by reference to FIGS. 1 and 5. Tube 81 is welded rearward of torsion spring housing 18. Riveted to both torsion arms 16, are plastic supports 29. The normal position (i.e., no pre-loading) of torsion arms 16 would be horizontal, as indicated by the horizontal line in FIG. 5. However, torsion arms 16 are forced counter-clockwise approximately 20 degrees. As rubbery substance 22 attempts to force downward torsion arms 16, plastic supports 29 brace against tube 81 and the downward motion is stopped. The result is therefore a pre-loaded torsion spring assembly 17.

SECOND PREFERRED EMBODIMENT

Rubber Torsion Shock Absorber—with Hysteresis Damping

A second preferred embodiment utilizes hysteresis damping to dampen the motion of torsion spring 50. Hysteresis damping as applied to a spring is where spring energy is dissipated through the deformation of a resilient, substantially solid state damping material. In a preferred embodiment of the present invention, the substantially solid state material is rubber.

A second embodiment of torsion spring assembly 17 is made by substituting the elements described in FIG. 6E (i.e., plastic friction washers 25) with elements described in FIGS. 8A and 8B. Instead of placing plastic friction washers 25 between torsion arms 16 and outer housing 18B, components are inserted to add a damping effect to the torsional motion resisted by torsion spring 50. As seen in FIG. 8B, outer housing 18B has key cutout 18C. Elastomer plate 26 is made out of a high loss factor rubbery substance. Metal elastomer backing plate 26A is cut to fit at key cutout 18C, as shown in FIG. 8A. Rolling indentor retainer 27 is made out of metal and has 6 holes to accept rolling indentors 28. Also, rolling indentor retainers 27 have a hexagonal internal cutout so as to have a tight fit over actuation shafts 23. Rolling indentors 28 are made out of metal ball bearings and have a diameter of approximately ¼ inch. Their diameter is slightly larger than the diameter of the holes in indentor retainer 27.

Installing Second Embodiment

All procedures of installing the second embodiment are identical to that of the first embodiment through the installation of actuation shafts 23. Elastomer plates 26 are bonded to elastomer backing plates 26A, which are then keyed to key cutout 18C of outer housing 18B. Rolling indentors 28 are then placed against rolling indentor retainers 27 and both are slid over actuation shafts 23 and pressed against elastomer plates 26. Torsion arms 16 are then slid over shafts 23 and the entire assembly is tightened with bolt 24 and nut 24A as described above under the first embodiment.

Operation of the Damper

As torsion arms 16 cause actuation shafts 23 to rotate, indentor retainers 27 rotate as well. However, elastomer plates 26 remain essentially stationary because they are keyed to key cutout 18C of outer housing 18B. Between rotating elastomer plates 26 and indentor retainers 27 are rolling indentors 28. As indentor retainers 27 rotate around shafts 23, rolling indentors roll against elastomer plates 26 dampening the effect of torsion spring assembly 17 through hysteresis losses in the elastomer.

THIRD PREFERRED EMBODIMENT

Adjustable Preload and Damping

Figure 12:
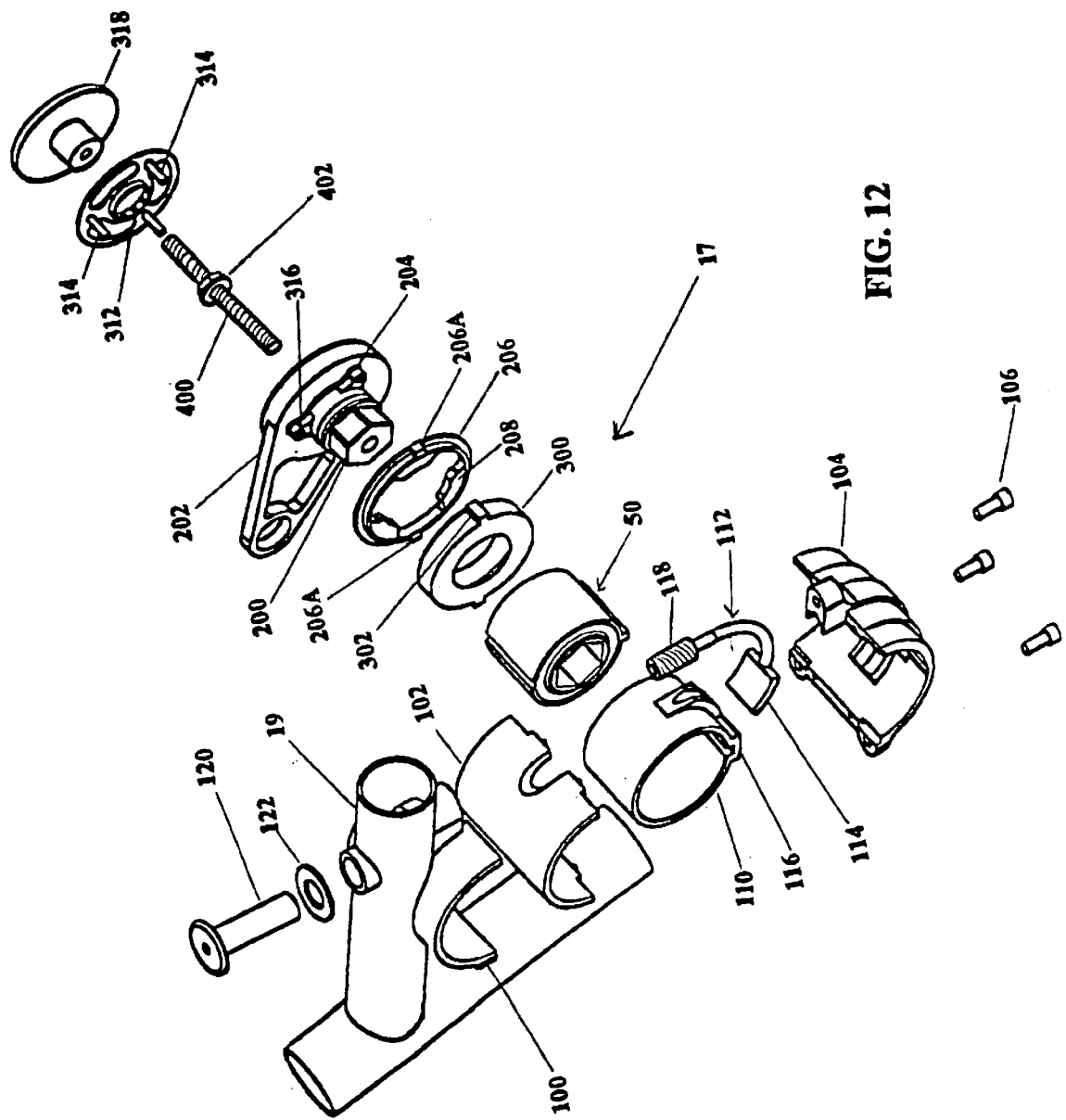
FIG. 12 shows an exploded view of another preferred embodiment of the present invention.
Figure 13:
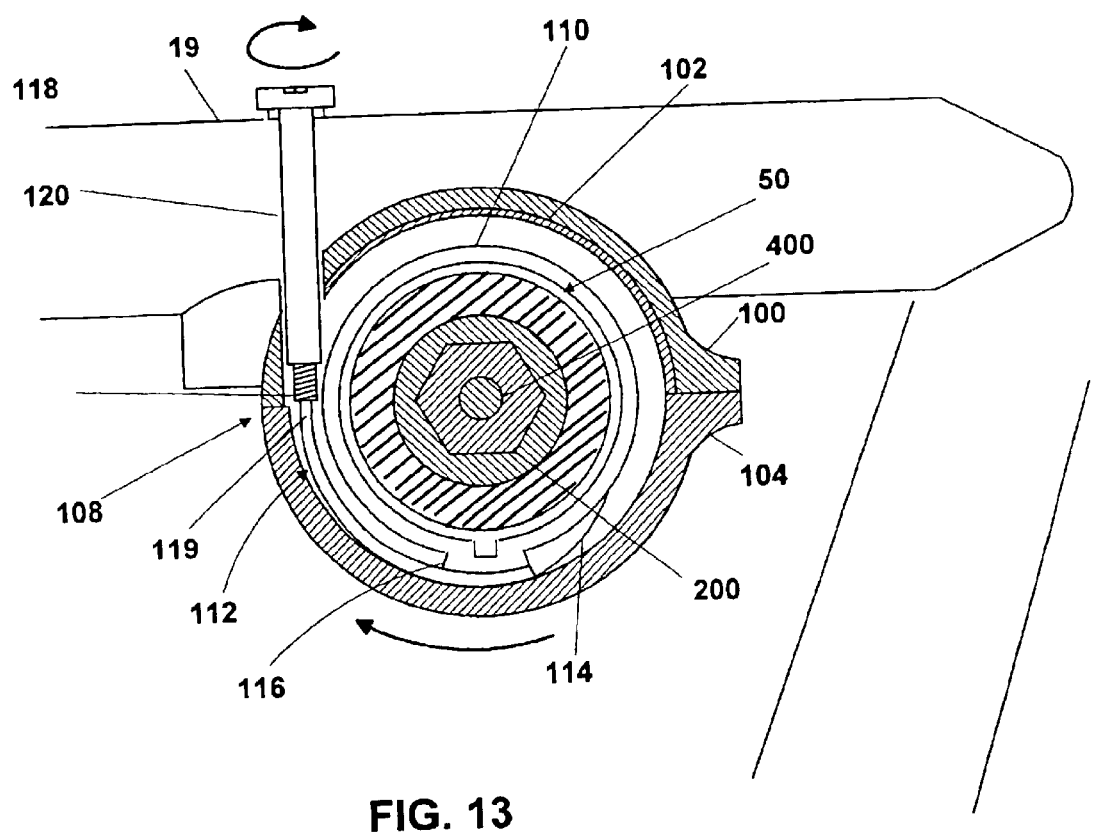
FIG. 13 shows a cross sectional view of another preferred embodiment of the preload assembly.

A third preferred embodiment showing adjustable preload capability is seen by reference to FIGS. 12 and 13. FIG. 12 shows an exploded view of torsion spring assembly 17 with adjustable preload. In FIG. 12 only the right side components are shown. It should be noted that the left side components are identical to right side except that there is just one torsion spring 50 and just one threaded rod 400. In this embodiment, bracket 100 is welded to top tube 19. Torsion spring 50 is press fit inside spring housing 110. Preload cable assembly 112 is then attached to spring housing 110 so that cable stop 114 is adjacent to key 116 of spring housing 110. Spring housing 110 and preload cable assembly 112 are lowered into the pocket in lower shell 104. Lower shell 104 allows for free rotation of spring housing 110 and preload cable assembly 112, but no axial motion. Upper shell 102 is then snapped to lower shell 104 and lower shell 104 is mounted to bracket 100 with mounting bolts 106. When rigidly bolted together with bolts 106, upper shell 102, lower shell 104 and bracket 100 form torsion spring assembly housing 108, as shown in FIG. 13. Threaded cable end 118 is threaded inside preload adjust bolt 120 after preload adjust bolt has been lowered through thrust washer 122, top tube 19, bracket 100 and upper shell 102.

Operation of the Adjustable Preload

As shown in FIG. 13, rotating preload adjust bolt 120 causes threaded cable end 118 to rise inside preload adjust bolt 120. This causes cable 119 to pull cable stop 114, rotating outer shell 18A of torsion spring 50 clockwise to preload the torsion spring. In the case of the 13 inch pound per degree, a twenty degree rotation will provide a 260 inch pound preload. For example, this may be a desirable preload for a 150 pound rider.

Adjustable Preload Stops

Figure 14:
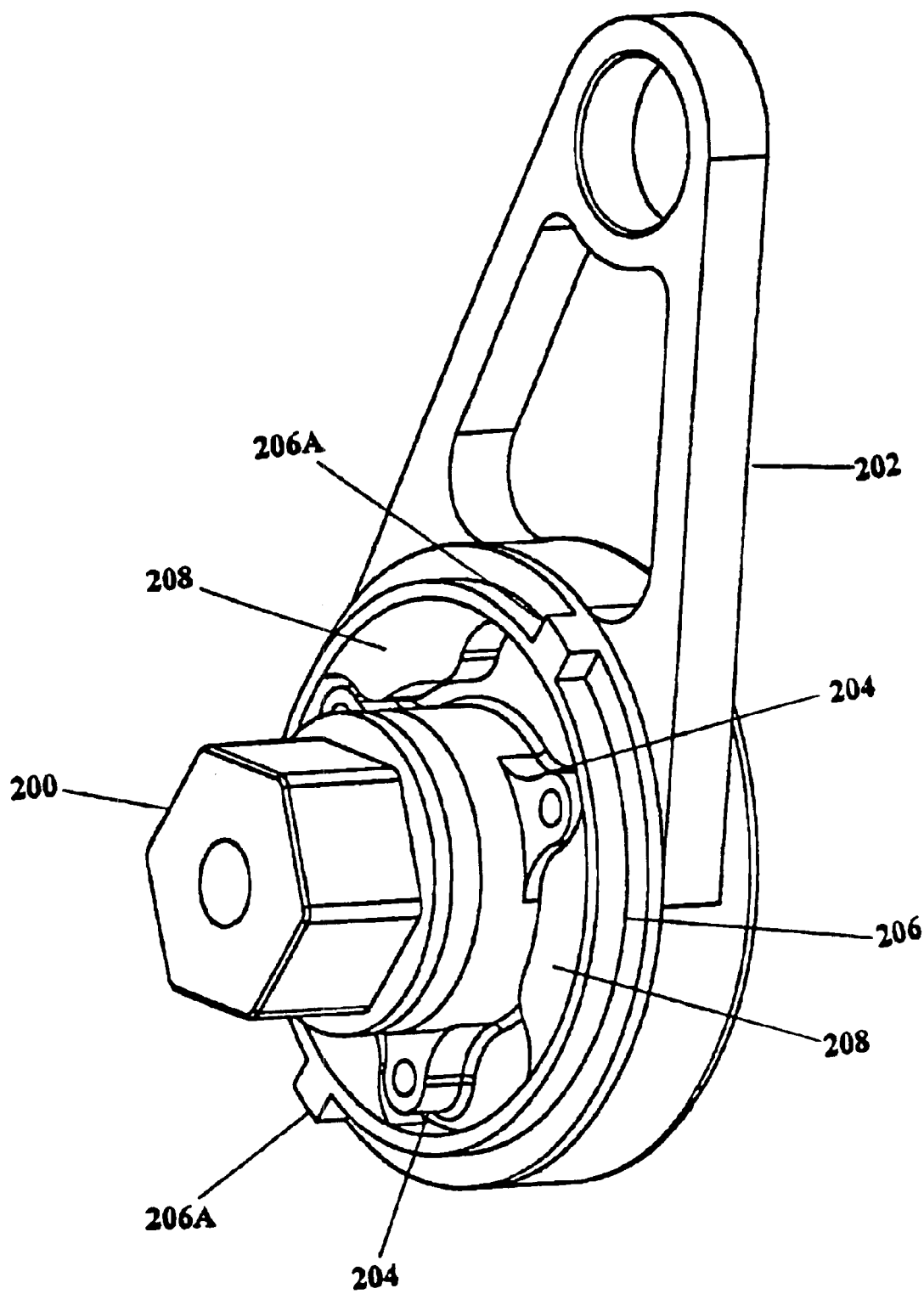
FIG. 14 shows link ear stops preventing link ears from further rotation.

As shown in FIG. 14 and FIG. 12, actuation shaft 200 is rigidly attached to torsion arm 202. Link ears 204 are also rigidly attached to torsion arm 202. Rebound/compression stop 206 is rigidly keyed to upper shell 102 and lower shell 104 at keys 206A. Link ear stops 208 are rigidly attached to rebound/compression stop 206. In a preferred embodiment, link ear stops 208 are fabricated from hard rubber.

As torsion spring 50 rotates clockwise as the result of rotation of preload adjust bolt 120, continuous rotation of actuation shaft 200 is prevented by link ears 204, because link ears 204 are stopped by link ear stops 208 as shown in FIG. 14. When link ears 204 are stopped from further rotation by link ear stops 208, the preload of torsion spring 50 can be varied by rotation of preload adjust bolt 120 as describe above. It should be noted that compression/rebound stops 206 also function to limit torsion spring 50 rotation in the counter-clockwise direction when excessive shock forces are applied to the front or rear wheel axis of the bicycle.

Adjustable Damping

Figure 15:
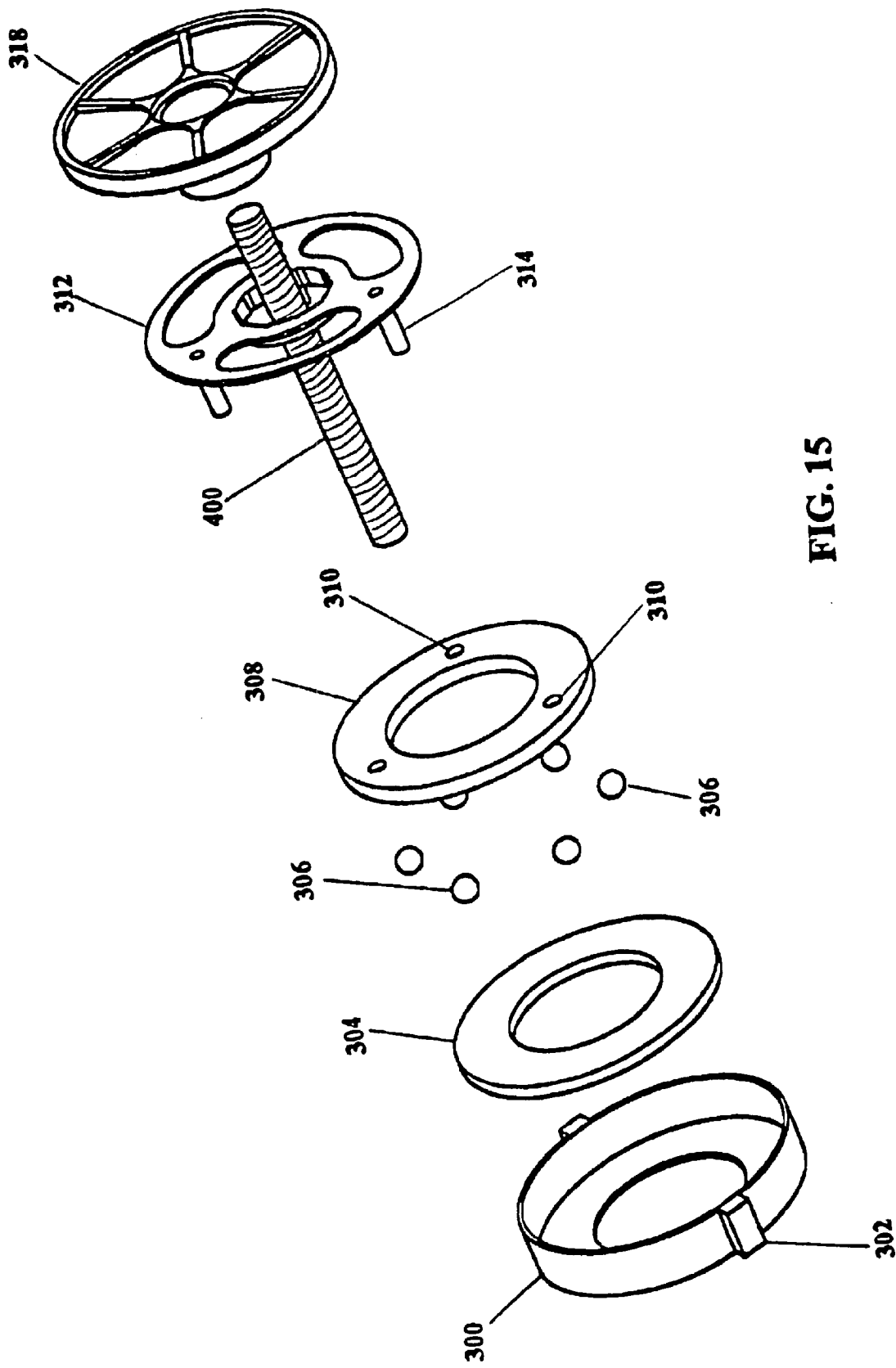
FIG. 15 shows an exploded view of another preferred embodiment of the damping assembly.
Figure 18:
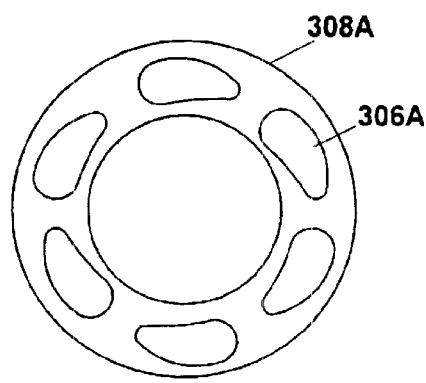
FIGS. 18 and 19 show sliding indentors rigidly attached to an indentor retainer.
Figure 19:
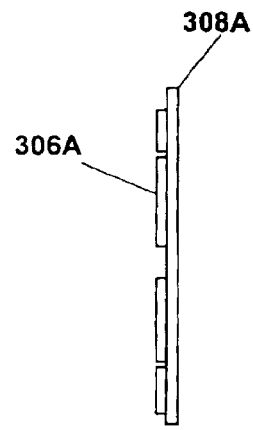

The adjustable damping capability is seen by reference to FIGS. 12 and 15. Damper housing 300 is keyed utilizing keys 302 to upper shell 102 and lower shell 104 so that it is rigid with respect to the front portion of the bicycle frame and does not rotate with respect to torsion spring 50. Elastomer damping surface 304 is bonded to damper housing 300. Rolling indentors 306 are held against elastomer damping surface 304 by indentor retainer 308. Note that indentor retainer 308 is dimpled on the side facing elastomer damping surface 304 (dimples not shown in drawing) to hold in place rolling indentors 306. Indentor retainer 308 has holes 310 that extend approximately half way through indentor retainer 308. Damper actuation plate 312 has actuation prongs 314 that insert into holes 310. Prior to their insertion into holes 310, however, actuation prongs first pass through holes 316 in torsion arm 202 as shown in FIG. 12. Damper adjust cap 318 is threaded onto threaded rod 400 outward of damper actuation plate 312. As shown in FIG. 12, threaded rod nut 402 is threaded onto threaded rod 400 and functions to press tightly torsion arm 202. Hence, the degree of damping on torsion spring assembly 17 is independent of the tightness of threaded rod nut 402 against torsion arm 202.

As torsion arm 202 rotates, damper actuation plate 312 also rotates because actuation prongs 314 are inserted through holes 316. Actuation prongs 314 mate with holes 310, therefore causing indentor retainer 308 to rotate as well. By tightening damper adjust cap 318, actuation prongs 314 are pressed tighter against holes 310 in indentor retainer 308. This increases the damping of torsion spring assembly 17 by increasing the axial force on rolling indentors 306. Likewise, as damper adjust cap 318 is loosened, the damping of torsion spring assembly 17 is decreased.

FOURTH PREFERRED EMBODIMENT

Hysteresis Damping as Applied to a Linear Shock Absorber

Figure 20:
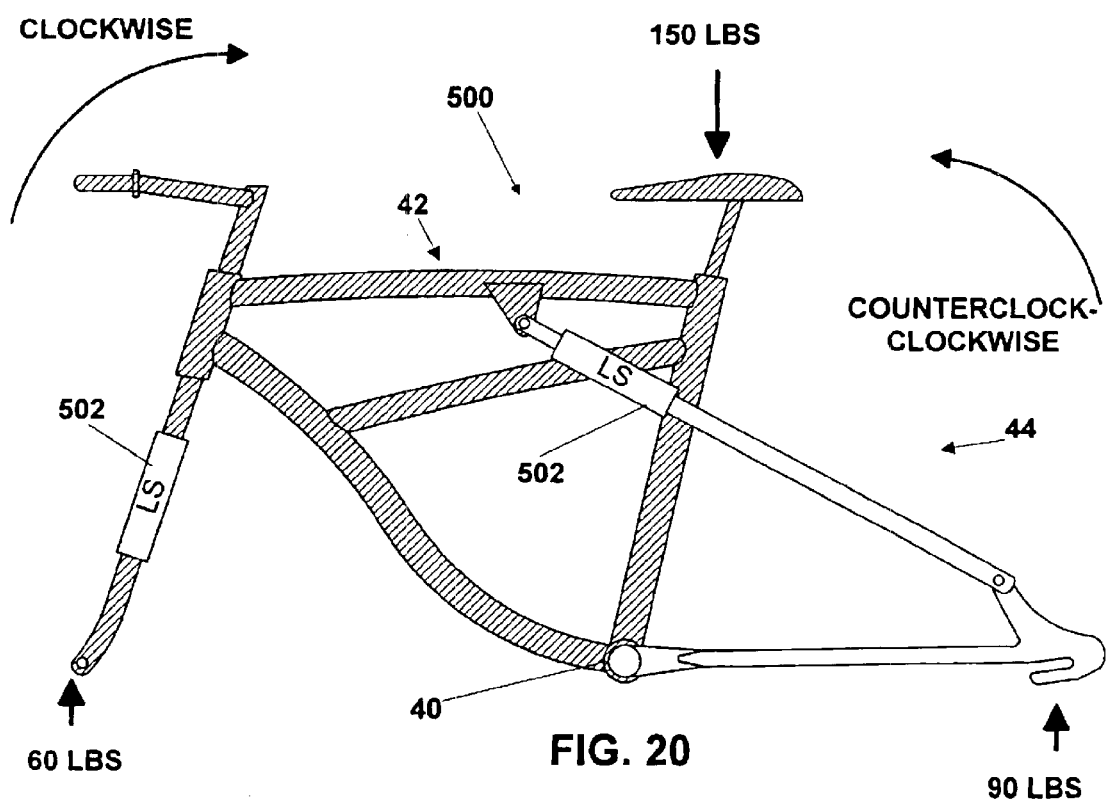
FIG. 20 shows a side view of a bicycle with a linear shock absorber.

A fourth preferred embodiment is seen by reference to FIGS. 16 and 17. In the above-preferred embodiments, hysteresis damping was described as being applied to a torsional shock absorber. However, it is also possible to use hysteresis damping for linear shock absorbers. The frame of bicycle 500 with linear shock absorbers 502 is shown in FIG. 20. The frame is divided into two parts, a front portion 42 (shown shaded) and a rear portion 44 (unshaded). Both sections are pivotally connected to each other at pedal axis 40 and they pivot about pedal axis 40. Shock forces applied to either front or rear axis by bumps are absorbed by linear shock absorbers 502.

A detailed view of linear shock absorber 502A is shown in FIG. 16. Piston 504 is connected to front portion 42 and piston housing 506 is connected to rear portion 44. Connection tabs 508 are rigidly attached to piston housing 506 and connection tabs 510 are rigidly attached to piston 510. Rubber tension spring 512 is rigidly connected to both piston housing tabs 508 and piston tabs 510. Elastomer surface 520 is rigidly attached to piston housing 506. Elastomer absorption pad 518 is also rigidly attached to piston housing 506. Indentor retainers 514 are rigidly connected to piston 504 and rolling indentors 516 are rollingly connected to indentor retainers 514. In a preferred embodiment rolling indentors 516 are spherical. The number of rolling indentors 516 and indentor retainers 514 varies with damper force requirements.

As shock forces are applied to the bicycle, piston 504 moves downward relative to piston housing 506. The downward motion of piston 504 is resisted by rubber tension spring 512. As piston 504 moves relative to piston housing 506, rolling indentors 516 press into elastomer surface 520. The upward, return motion of piston 504 is dampened through hysteresis losses in elastomer surface 520.

FIG. 17 shows another embodiment of linear shock absorber 502B with a hysteresis damper. Linear shock absorber 502B differs from linear shock absorber 502A in that indentor retainers 514 and rolling indentors 516 have been replaced with sliding indentor 522.

FIFTH PREFERRED EMBODIMENT

Dip Brazing Bicycle Frame

Figure 21:
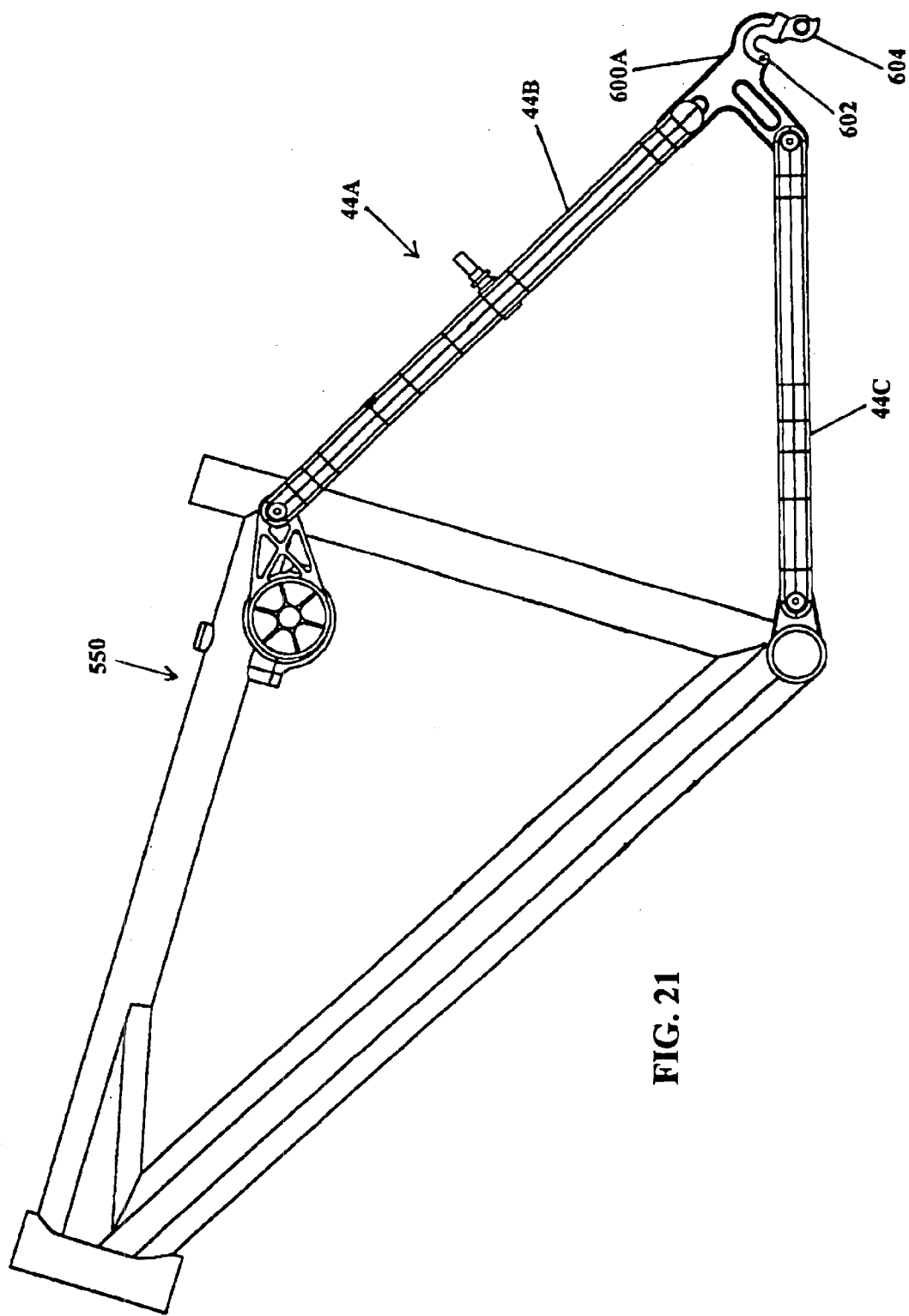
FIG. 21 shows a side view of a preferred embodiment of the present invention.
Figure 22:
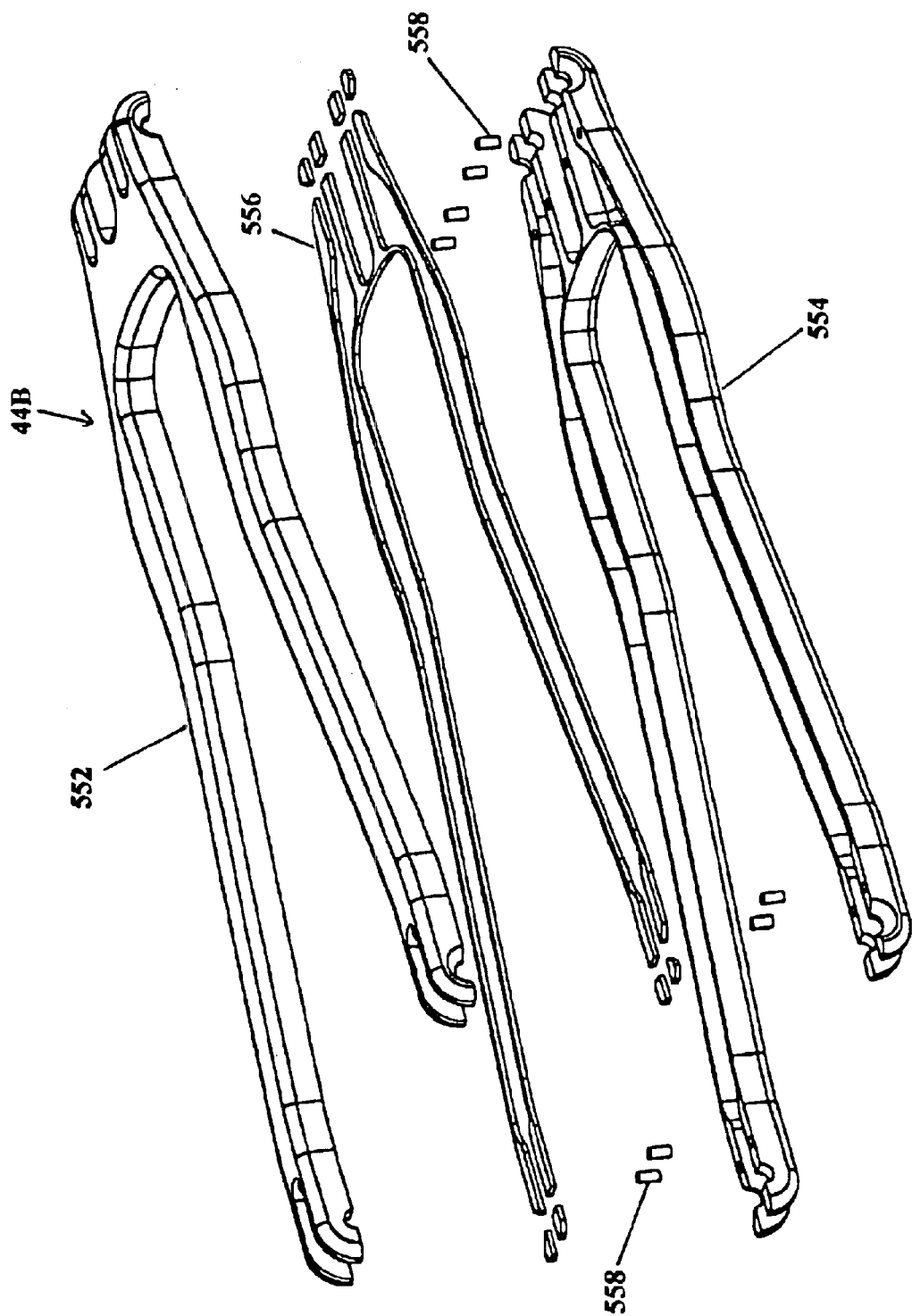
FIG. 22 shows a detailed view of the components of a seat stay prior to it being dip brazed.
Figure 23:
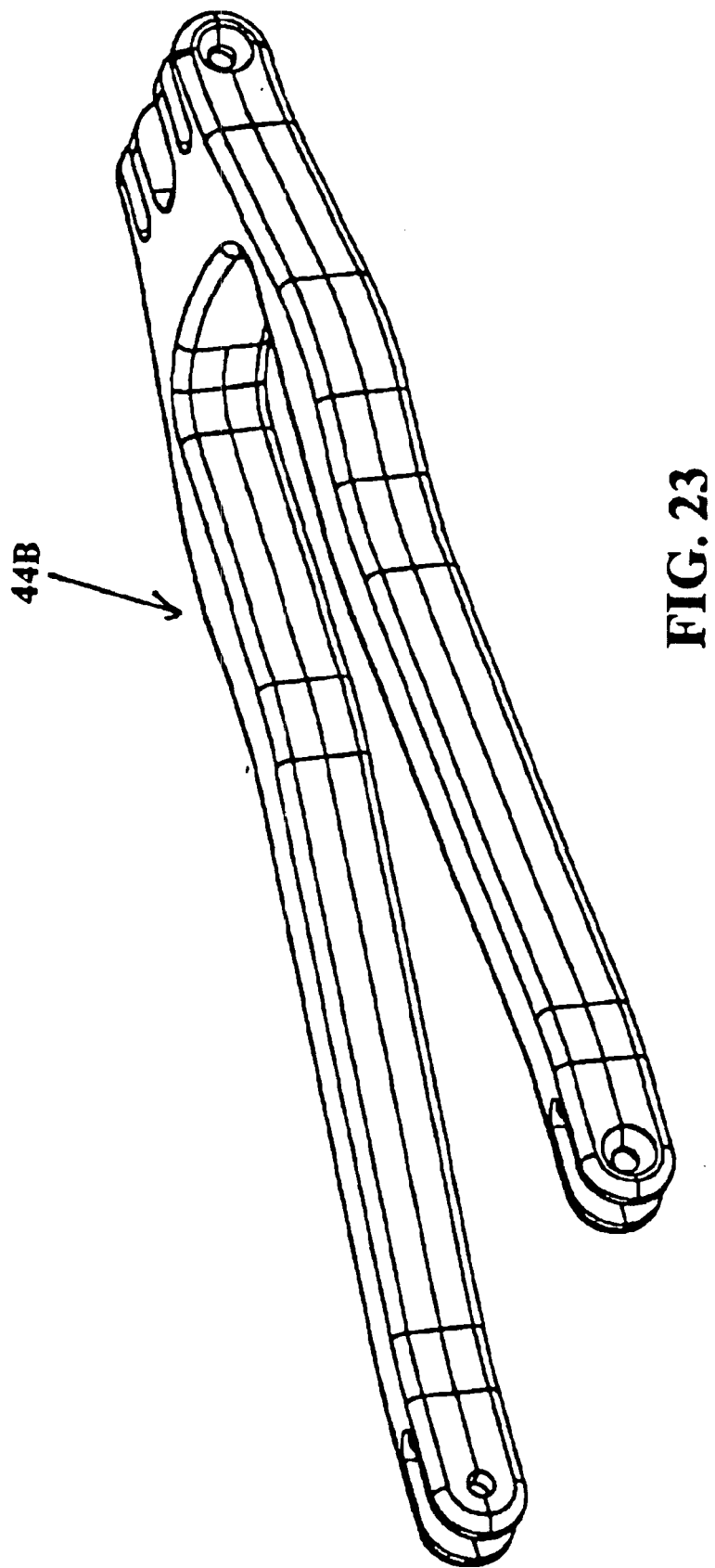
FIG. 23 shows the seat stay shown in FIG. 22 after its two halves have been joined together.

FIG. 21 shows a side view of a preferred embodiment of the present invention in which chain stay 44C and seat stay 44B of rear portion 44A of bicycle frame 550 have been dip brazed. FIG. 22 shows a detailed view of the components of seat stay 44B prior to it being dip brazed. To dip braze seat stay 44B, upper half 552 and lower half 554 are first cleaned. Then, filler metal 556 is placed between upper half 552 and lower half 554 and the two halves are joined together. In a preferred embodiment, filler metal 556 is an aluminum brazing alloy. Connecting pins 558 help align upper half 552 appropriately with lower half 554. After the two halves are joined together, seat stay 44B appears as shown in FIG. 23. Seat stay 44B is then preheated to approximately 1000 deg. F. It is then immersed in a molten salt bath at approximately 1400 deg. F. to melt filler metal 556. Seat stay 44B is then removed from the molten salt bath and it cools. Consequently, filler metal 556 re-hardens, brazing together upper half 552 and lower half 554.

Similarly, the front portion of bicycle frame 550 can also be dip brazed from two halves. By referring to FIG. 22, the advantages of dip brazing are made very clear. The manufacturer is able to precisely machine upper half 552 and lower half 554 to the exact shape he needs for the bicycle frame section. Also, many sections of frame can be dip brazed at once in the same molten salt bath, saving time and money in the construction process.

SIXTH PREFERRED EMBODIMENT

Snap-On Drop Protector/Derailleur Hanger

Figures 26, 27:
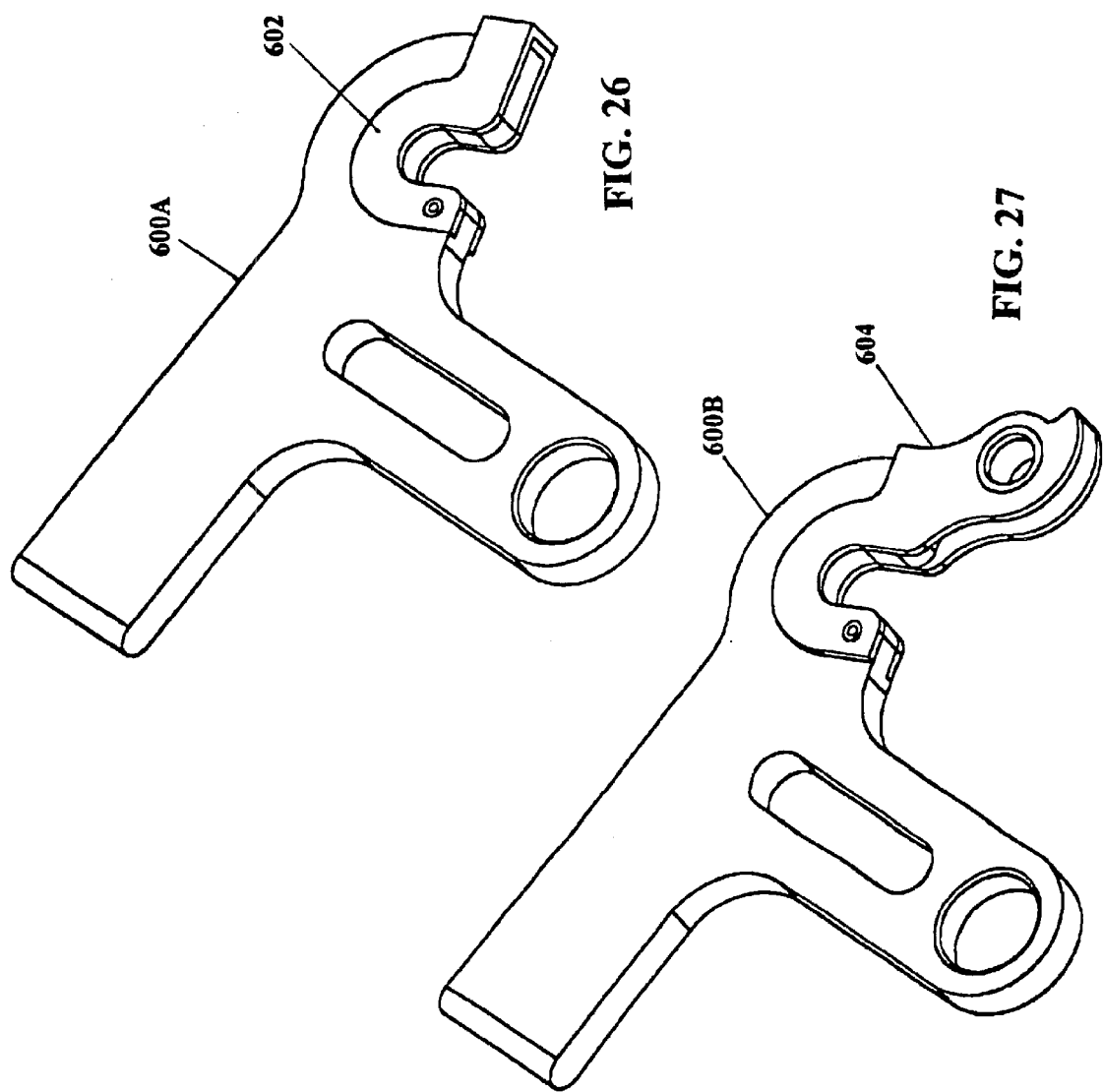
FIG. 26 shows the drop protector of FIG. 24 attached to the bicycle drop.
FIG. 27 shows the drop protector/derailleur hanger of FIG. 25 attached to the bicycle drop.

FIG. 21 shows drop 600A rigidly connected to seat stay 44B and chain stay 44C of rear portion 44A. Drop protector 602 is shown attached to drop 600A. FIG. 24 shows an exploded view of drop protector 602 and drop 600A. FIG. 25 shows an exploded view of drop protector/derailleur hanger 604 and drop 600B. FIG. 26 shows drop protector 602 and drop protector/derailleur hanger 604 snapped onto drop 600A and drop 600B.

In a preferred embodiment of the present invention, drop protector 602 and drop protector/derailleur hanger 604 are both fabricated from steel or 7075 aluminum. They are snapped to drop 600A and 600B via attachment pins 606. Drop 600A and drop 600B are both slightly recessed at 608 to aid in firmly securing drop protector 602 and drop protector/derailleur hanger 604.

Drop protector 602 and drop protector/derailleur hanger 604 have the following advantages over the prior art: 1) there are no tells tools required to replace or install (they merely snap in place), 2) they protect drops 600A and 600B on both sides of the drops, 3) the rear wheel axle bolt will secure and clamp them in place, and 4) they will not fail off when the rear wheel is removed.

OTHER EMBODIMENTS

Location of the Torsional Shock Absorber Assembly

Figure 10A:
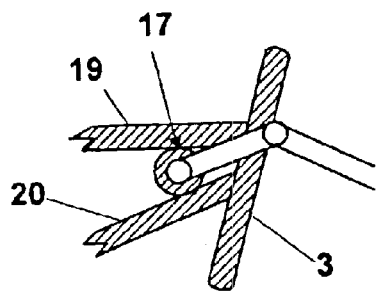
FIGS. 10A–10F show possible locations for the torsional shock absorber assembly.
Figure 10B:
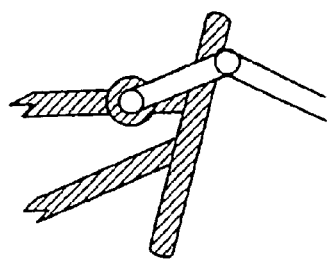
Figure 10C:
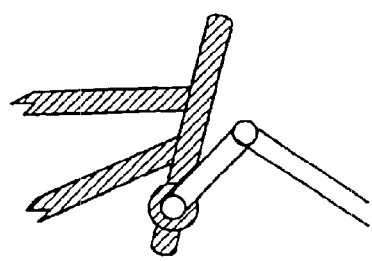
Figure 10D:
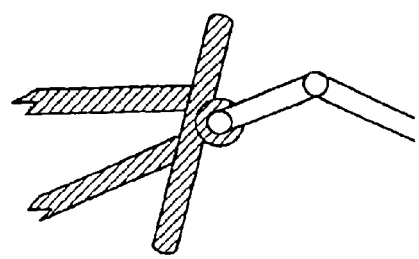
Figure 10E:
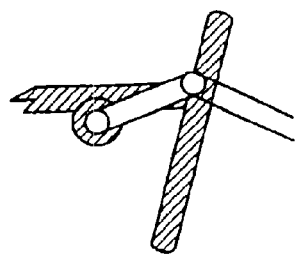
Figure 10F:
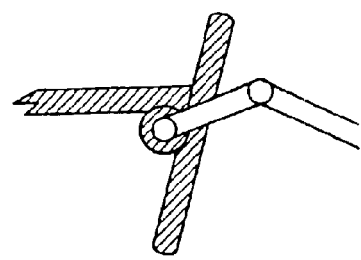

Preferred embodiments described the location of torsion spring assembly 17 as being located in-between top tube 19 and middle brace 20 and just forward of seat support tube 3, as shown in FIG. 10A. However, torsion spring assembly 17 could be placed in several other locations on the bicycle frame as well. For example, it could be welded into top tube 19 (as shown in FIG. 10B), or into seat tube 3 (as shown in FIG. 10C), or behind seat tube 3 (as shown in FIG. 10D), or underneath top tube 19 (as shown in FIG. 10E), or wedged in-between top tube 19 and seat tube 3 (as shown in FIG. 10F).

Other Bicycle Frame Types

Figure 11A:
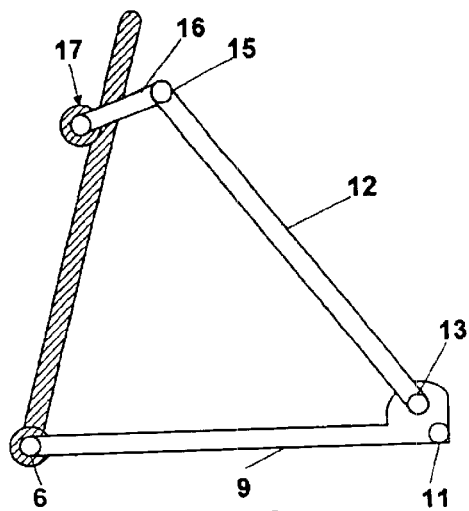

In FIGS. 11A–11G, the shaded parts of the bicycle frame tend to rotate clockwise as vertical force is applied to rear wheel axis 11 and the non-shaded parts tend to rotate counter-clockwise. The preferred embodiment was based on a modification of cruiser bicycle frame, as shown in FIG. 11A. To review, vertical force is transferred through rear wheel axis 11 to cause swingarm 9 to pivot concentric to bottom bracket shell 6.

Figure 11B:
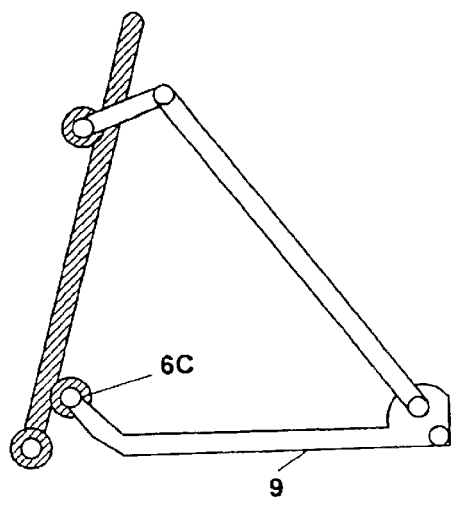
Figure 11C:
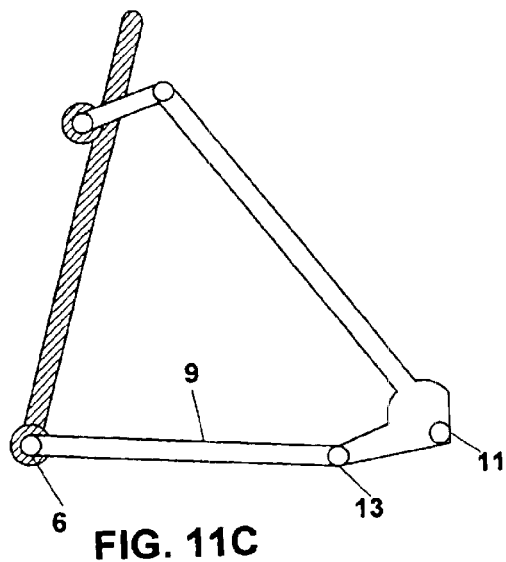
Figure 11D:
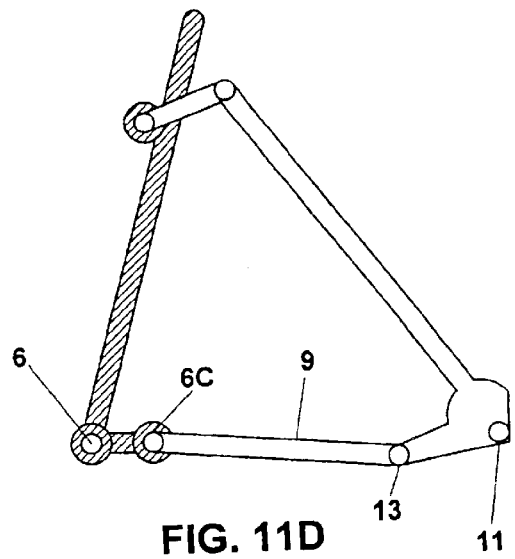

Motion is therefore transferred to rear arm 12 through lower pivot axis 13 and then to torsion arm 16 through upper pivot axis 15. This causes counter-clockwise rotation of torsion arm 16, which is resisted by torsion spring assembly 17. The present invention may also be used with other frame designs. For example, FIG. 11B illustrates a modification of a neutral pivot type rear suspension design. Here the lower pivot point for swingarm 9 is at pivot 6C rather than at bottom bracket shell 6. FIG. 11C illustrates a modification of a Horst-link rear suspension with bottom bracket pivot design. Here, lower pivot 13 is in-between bottom bracket shell 6 and rear wheel axis 11. FIG. 11D illustrates a modification of a traditional Horst-link rear suspension design. Here, pivot 6C is rigidly connected to the bicycle frame rearward of bottom bracket shell 6 and lower pivot 13 is in-between rear wheel axis 11 and pivot 6C. FIGS. 11E–11G are examples of bicycle frames that do not utilize a rear arm 12. FIG. 11E illustrates a modification of a concentric bottom bracket swing arm design. In this design, rubbery substance 22 is bonded to the exterior surface of bottom bracket shell 6 and to the interior surface of bottom bracket housing 2. FIG. 11F illustrates a modification of a cantilever swingarm design. In this design, torsion spring housing 18 is welded to down tube 4, rubbery substance 22 is bonded to the interior surface of outer housing 18B (which is press fit inside and keyed to torsion spring housing 18) and to the exterior surface of shaft housing 21, which is rigidly connected to swing arm 9. FIG. 11G illustrates a modification of a floating drivetrain design. In this design, swingarm 9 and bottom bracket housing 2 containing spindle 6 are joined to form one large swingarm 30. Large swingarm 30 rigidly connects to shaft housing 21. Rubbery substance 22 is bonded to the exterior surface of shaft housing 21 and to the interior surface of outer housing 18B (which is press fit inside and keyed to torsion spring housing 18). Torsion spring housing 18 is welded at the intersection of seat tube 3 and down tube 4.

Other Possible Uses of a Torsion Spring Besides Rear Suspension

There are other possible uses of a rubber torsion spring on a bicycle besides for rear suspension. For example, a torsion spring could be place in-between the handlebars and the front wheel axis to provide front suspension. Or, a torsion spring could be placed on the handlebars to provide shock absorption for the bicycle rider's hands. Or a torsion spring could be placed in-between the bicycle seat and the bicycle frame for shock absorption or on the bicycle's stem.

Other Modifications

For rubbery substance 22, the type of rubber used was natural rubber. Synthetic rubbers are also possible as well as other rubbery type substances.

In the third preferred embodiment, it was described how link ears 204 braced against link ear stops 208 and therefore actuation shaft 200 was prevented from further rotation when preload adjust bolt 120 is turned. However, in another preferred embodiment link ears 204 and link ear stops 208 can be removed and actuation shaft 200 can be prevented from further rotation by utilizing plastic supports 29 shown in FIG. 5. In other words, plastic support 29 could be riveted to torsion arm 202 and tube 81 could be welded rearward of bracket 100. Therefore, when preload adjust bolt 120 is turned, plastic support 29 will brace against tube 81 and prevent further rotation of actuation shaft 200.

Also, in the third preferred embodiment an adjustable damper was described that utilized rolling indentors 300, elastomer damping surface 304 and indentor retainer 308. It was described how a larger dampening effect could be achieved by tightening damper actuation plate 312 against indentor retainer plate 308. Those of ordinary skill in the art should recognize that other dampening devices would be effective as well. For example, a friction damper or a viscous damper could be substituted in place of rolling indentors 300, elastomer damping surface 304 and indentor retainer 308.

In the preferred embodiments, it was described how the front portion of the bicycle frame was rigidly attached to the torsion spring assembly housing and how the rear portion of the bicycle frame was attached to the torsion spring assembly shaft. However, those of ordinary skill in the art will recognize, of course, that this could be reversed and that the front portion of the frame could be attached to the torsion spring assembly shaft and that the rear portion of the frame could be attached to the torsion spring assembly housing.

In the third preferred embodiment, the adjustable damper was described as being utilized in conjunction with the adjustable preload device. However, those of ordinary skill in the art will recognize that the adjustable preload device and the adjustable damper could be used independently of each other. For example, the adjustable damper disclosed in FIG. 15 could be interchanged for the damper disclosed in FIG. 8A.

In the preferred embodiments, it was described how torsion spring 50 was inserted inside torsion spring assembly housing 18. However, those of ordinary skill in the art will recognize that the shape of the outer surface of outer housing 18B could be modified so that torsion spring 50 could be rigidly attached to the bicycle frame without using a torsion spring assembly housing device. In other words, for example, torsion spring 50 could be bolted, welded or clamped to the bicycle frame.

In the preferred embodiments, it was described how for torsion spring 50, rubbery substance 22 is bonded to the internal smooth surface of outer housing 18B and the external smooth surface of shaft housing 21. Those of ordinary skill in the art will recognize that rubbery substance 22 can also be vulcanized to the internal smooth surface of outer housing 18B and the external smooth surface of shaft housing 21 or it can be both bonded and vulcanized to the internal smooth surface of outer housing 18B and the external smooth surface of shaft housing 21. Those of ordinary skill in the art will also recognize that it is possible to make a rubber torsion spring where the rubber is neither bonded nor vulcanized to the shaft or housing. For example, FIG. 29 shows rubber torsion spring 50A. Aluminum shaft housing 21A is inserted inside outer housing 18D. Rubber blocks 700 are slid inside outer housing 18D to fit snuggly between outer housing 18D and aluminum shaft housing 21A. It is not necessary to bond or vulcanize rubber blocks 700 to either outer housing 18D or aluminum shaft housing 21A. As with other preferred torsion springs, key 18E functions to prevent slippage between spring housing 110A (FIG. 28) and outer housing 18D.

In the preferred embodiments, it was described how rolling indentors 28 are made out of metal ball bearings. Those of ordinary skill in the art will recognize that rolling indentors 28 could also be made out of other equivalent materials, such as hard plastic. Also, those of ordinary skill in the art will recognize that sliding indentors could be substituted for rolling indentors 28. For example, by referring to FIG. 15, indentor retainer 308 could have sliding indentors welded to the side of indentor retainer 308 that faces elastomer damping surface 304. These sliding indentors would provide damping by rubbing against elastomer damping surface 304. This embodiment is illustrated specifically by reference to FIGS. 18 and 19 which show sliding indentors 306A rigidly attached to indentor retainer 308A.

For the preferred embodiments, one torsion spring assembly 17 was described, as shown if FIG. 1. However, it is possible to put a rubber torsion spring at every location where there is a pivot. For example, referring to FIG. 1, a rubber torsion spring could be place in-between bottom bracket shell 6 and bottom bracket housing 2. Furthermore, a torsional spring assembly could be place at lower pivot axis 13 and at upper pivot axis 15.

Figure 28:
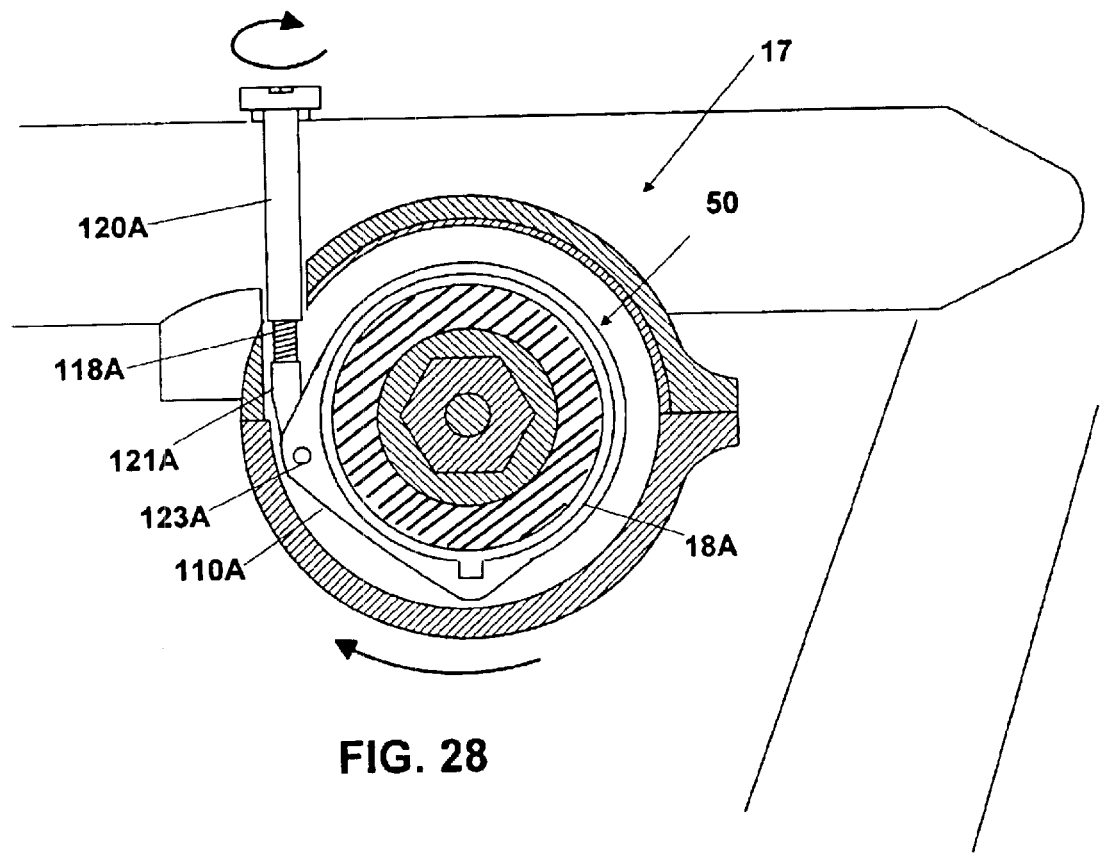
FIG. 28 shows a preferred embodiment of an adjustable preload for torsion spring assembly.
Figure 29:
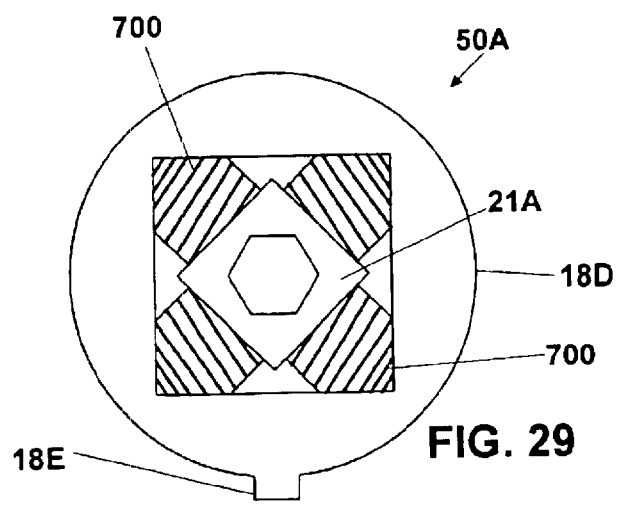
FIG. 29 shows another preferred embodiment of the present invention.

FIG. 28 presents another embodiment of adjustable preload for torsion spring assembly 17. In this preferred embodiment, preload bolt 118A is threaded inside preload adjust bolt 120A at threaded bolt 118A's top end. At the bottom end of preload bolt 118A, it is connected to pivot section 121A. Pivot section 121A is pivotably connected at 123A to spring housing 110A. Rotating preload adjust bolt 120A causes preload bolt 118A to rise inside preload adjust bolt 120A. This causes pivot section 121A to pull spring housing 110A, rotating outer shell 18A of torsion spring 50 clockwise to preload the torsion spring. In the case of the 13 inch pound per degree, a twenty degree rotation will provide a 260 inch pound preload. For example, this may be a desirable preload for a 150 pound rider.

In the fourth preferred embodiment it was stated the spring in linear shock absorber 502A was rubber spring 512. However, those of ordinary skill in the art will recognize that other springs such as a metal coil spring could be used in conjunction with the hysteresis damper.

In the fifth preferred embodiment it was shown how sections of the bicycle frame could be made by dip brazing. Those of ordinary skill in the art will recognize that other forms of brazing besides dip brazing are also very effective. Other possible types of brazing methods include vacuum brazing, torch brazing and furnace brazing.

FIGS. 24 and 25 show drop protector 602 and drop protector/derailleur hanger 604 with holes to accept attachment pin 606. However, those of ordinary skill in the art will recognize that the holes in drop protector 602 and drop protector/derailleur hanger 604 could be replaced with protrusions that extend inward. In this embodiment, attachment pin 606 would be replaced with an indentation or a hole to accept the protrusions.

Although the above-preferred embodiments have been described with specificity, persons skilled in this art will recognize that many changes to the specific procedures disclosed above could be made without departing from the spirit of the invention. Therefore, the scope of the invention is to be determined by the appended claims and their legal equivalents.

I claim:

1. A bicycle with a shock absorption assembly comprising:
    A) a bicycle frame defining a front portion and a rear portion, said front portion and said rear portion being pivotally connected at a pivot point,
    B) at least one torsion spring assembly comprising:
       1) an outer housing defining an inner surface,
       2) a shaft defining an outer surface,
       3) a rubbery substance positioned between said inner surface of said housing and said outer surface of said shaft, and
       4) a damper,
    wherein, either one of said front portion or said rear portion of said frame is attached to said outer housing and the other one of said front portion or said rear portion is attached to said shaft such that shock forces acting on said front or rear wheels are absorbed in said torsion spring assembly.

2. A bicycle as in claim 1, wherein said damper comprises:
    A) at least one elastomer plate keyed to said outer housing,
    B) a plurality of indentors,
    C) at least one indentor retainer to hold said plurality of indentors against said elastomer plate,
    D) a nut and bolt assembly to press at least one torsion arm, said at least one elastomer plate, said plurality of indentors, and said at least one indentor retainer tightly against said outer housing for damping of said torque.

3. A bicycle as in claim 2, wherein said plurality of indentors is a plurality of rolling indentors to roll against said elastomer damper surface.

4. A bicycle as in claim 2, wherein said plurality of indentors is a plurality of sliding indentors to slide against said elastomer damper surface.

5. A bicycle as in claim 1, wherein said damper is an adjustable damper.

6. A bicycle as in claim 5, wherein said adjustable damper is a rotary damper.

7. A bicycle as in claim 5, wherein said adjustable damper comprises:
A) a damper housing rigidly keyed to said outer housing,
B) an elastomer damper surface bonded to said damper housing,
C) a plurality of indentors,
D) at least one indentor retainer to hold said plurality of indentors against said elastomer damper surface,
E) a damper actuation plate comprising actuation prongs to apply compressive force against said at least one indentor retainer, and
F) a damper adjust cap to adjust the force on said damper actuation plate, and
G) a threaded rod placed along the axis of said torsion spring assembly, wherein said damper adjust cap is threaded onto said threaded rod and the adjustment of force is achieved by turning said damper adjust cap.

8. A bicycle as in claim 7, wherein said plurality of indentors is a plurality of rolling indentors to roll against said elastomer damper surface.

9. A bicycle as in claim 7, wherein said plurality of indentors is a plurality of sliding indentors to slide against said elastomer damper surface.

10. A bicycle as in claim 1, wherein said rubbery substance is an elastomer.

11. A bicycle as in claim 1, wherein said rubbery substance is natural rubber.

12. A bicycle as in claim 1, wherein said torsion spring assembly is rigidly attached between the top tube and seat tube of said bicycle frame.

13. A bicycle as in claim 1, wherein said bicycle frame is a modified Horst-link four-bar linkage rear suspension frame with concentric bottom bracket pivot.

14. A bicycle with a shock absorption assembly comprising:
A) a bicycle frame defining a front portion and a rear portion, said front portion and said rear portion being pivotally connected at a pivot point,
B) at least one torsion spring means comprising a:
1) an outer housing defining an inner surface,
2) a shaft defining an outer surface,
3) a rubbery substance positioned between said inner surface of said housing and said outer surface of said shaft, and
4) a damping means, wherein, either one of said front portion or said rear portion of said frame is attached to said outer housing and the other one of said front portion or said rear portion is attached to said shaft such that shock forces acting on said front or rear wheels are absorbed in said torsion spring assembly.

15. A bicycle as in claim 14, wherein said rubbery substance is bonded to said inner surface of said housing and said outer surface of said shaft.

16. A bicycle as in claim 14, wherein said dampening means comprises:
A) at least one elastomer plate keyed to said outer housing,
B) a plurality of indentors, and
C) at least one indentor retainer to hold said plurality of indentors against said elastomer plate, a nut and bolt assembly to press at least one torsion arm, said at least one elastomer plate, said plurality of indentors, and said at least one indentor retainer tightly against said outer housing for damping of said torque.

17. A bicycle as in claim 16, wherein said plurality of indentors is a plurality of rolling indentors to roll against said elastomer damper surface.

18. A bicycle as in claim 16, wherein said plurality of indentors is a plurality of sliding indentors to slide against said elastomer damper surface.

19. A bicycle as in claim 14, wherein said dampening means comprises:
A) a damper housing keyed to said outer housing,
B) an elastomer damper surface bonded to said damper housing,
C) a plurality of indentors,
D) at least one indentor retainer to hold said plurality of indentors against said elastomer damper surface,
E) a damper actuation plate comprising actuation prongs to apply compressive force against said at least one indentor retainer, and
F) a damper adjust cap to adjust the force on said damper actuation plate, and
G) a threaded rod placed along the axis of said torsion spring assembly, wherein said damper adjust cap is threaded onto said threaded rod and the adjustment of force is achieved by turning said damper adjust cap.

20. A bicycle as in claim 19, wherein said plurality of indentors is a plurality of rolling indentors to roll against said elastomer damper surface.

21. A bicycle as in claim 19, wherein said plurality of indentors is a plurality of sliding indentors to slide against said elastomer damper surface.

* * * * *